(12) United States Patent
Heller

(10) Patent No.: US 10,677,626 B2
(45) Date of Patent: Jun. 9, 2020

(54) FLOWMETER PROFILING SYSTEM FOR USE IN GROUNDWATER PRODUCTION WELLS AND BOREHOLES

(71) Applicant: BESST, Inc., San Rafael, CA (US)

(72) Inventor: Noah R. Heller, Fairfax, CA (US)

(73) Assignee: BESST, Inc., San Rafael, CA (US)

( * ) Notice: Subject to any disclaimer, the term of this patent is extended or adjusted under 35 U.S.C. 154(b) by 435 days.

(21) Appl. No.: 15/445,896

(22) Filed: Feb. 28, 2017

(65) Prior Publication Data

US 2017/0254687 A1 Sep. 7, 2017

Related U.S. Application Data

(60) Provisional application No. 62/302,080, filed on Mar. 1, 2016.

(51) Int. Cl.
*G01F 1/708* (2006.01)
*E21B 47/10* (2012.01)
*G01V 9/02* (2006.01)

(52) U.S. Cl.
CPC ........ *G01F 1/7086* (2013.01); *E21B 47/1015* (2013.01); *G01V 9/02* (2013.01)

(58) Field of Classification Search
CPC ...... E21B 47/1015; G01V 9/02; G01F 1/7086
See application file for complete search history.

(56) References Cited

U.S. PATENT DOCUMENTS

| 2,453,456 A | * | 11/1948 | Piety | .................... | E21B 47/1015 |
| | | | | | 250/260 |
| 3,105,900 A | * | 10/1963 | Widmyer | ................. | G01V 5/10 |
| | | | | | 250/258 |
| 3,343,408 A | * | 9/1967 | Mayer, Jr. | ............... | E21B 27/02 |
| | | | | | 73/152.39 |
| 3,345,868 A | * | 10/1967 | Ten Brink | ........... | E21B 47/1015 |
| | | | | | 73/152.18 |
| 3,395,277 A | * | 7/1968 | Mayer, Jr. | ................ | G21H 5/02 |
| | | | | | 250/260 |
| 4,166,215 A | * | 8/1979 | Anderson | ........... | E21B 47/1015 |
| | | | | | 250/260 |

(Continued)

*Primary Examiner* — John Fitzgerald
(74) *Attorney, Agent, or Firm* — Roeder & Broder LLP; James P. Broder

(57) ABSTRACT

A flowmeter profiling system for measuring a flow profile of water in a subsurface environment includes a tracer injection system positioned at least partially within the subsurface environment. The tracer injection system includes an injection tube that contains a tracer material, and an injection port that is coupled to the injection tube near a bottom of the injection tube. Additionally, the injection port is configured to inject the tracer material substantially horizontally into the subsurface environment. The injection port can include a plurality of exit holes such that the tracer material is injected substantially horizontally into the subsurface environment through each of the plurality of exit holes. The water can be in a groundwater production well having a cross-sectional plane, and the tracer material can be injected substantially horizontally into the groundwater production well through each of the plurality of exit holes to fill substantially the entire cross-sectional plane of the groundwater production well.

28 Claims, 10 Drawing Sheets

(56) References Cited

U.S. PATENT DOCUMENTS

| | | | | |
|---|---|---|---|---|
| 4,166,216 A * | 8/1979 | Cubberly, Jr. | E21B 47/1015 | 250/260 |
| 4,505,155 A * | 3/1985 | Jackson | E21B 17/003 | 73/152.18 |
| 4,538,683 A * | 9/1985 | Chulick | E21B 49/084 | 166/191 |
| 4,558,219 A * | 12/1985 | LeBlanc | E21B 47/1015 | 250/259 |
| 4,657,076 A * | 4/1987 | Tsutsumi | E21B 17/18 | 166/90.1 |
| 4,771,635 A * | 9/1988 | Trevillion | E21B 27/02 | 250/260 |
| 4,838,079 A * | 6/1989 | Harris | E21B 17/18 | 166/127 |
| 5,543,617 A * | 8/1996 | Roscoe | G01F 1/708 | 250/259 |
| 5,723,781 A * | 3/1998 | Pruett | E21B 47/01 | 250/260 |
| 5,881,807 A * | 3/1999 | Bøe | E21B 27/02 | 166/100 |
| 6,016,191 A * | 1/2000 | Ramos | E21B 47/1015 | 356/70 |
| 6,023,340 A * | 2/2000 | Wu | G01F 1/661 | 356/432 |
| 6,075,611 A * | 6/2000 | Dussan V | G01F 1/7086 | 356/432 |
| 6,125,934 A * | 10/2000 | Lenn | E21B 47/1015 | 166/250.12 |
| 6,131,451 A | 10/2000 | Izbicki et al. | | |
| 6,164,127 A | 12/2000 | Izbicki et al. | | |
| 6,321,595 B1 * | 11/2001 | Pope | B09C 1/00 | 166/252.2 |
| 6,393,925 B1 * | 5/2002 | Devlin | G01F 1/7088 | 73/861.05 |
| 6,645,769 B2 * | 11/2003 | Tayebi | E21B 47/1015 | 436/56 |
| 6,840,316 B2 * | 1/2005 | Stegemeier | E21B 43/00 | 166/250.12 |
| 7,659,123 B2 * | 2/2010 | Ball | G01N 15/0826 | 422/50 |
| 8,069,715 B2 * | 12/2011 | Keller | E21B 49/08 | 166/264 |
| 8,113,279 B2 * | 2/2012 | Lee | E21B 47/1015 | 166/250.12 |
| 8,173,955 B2 * | 5/2012 | Kalb | G01F 1/661 | 250/269.1 |
| 8,877,506 B2 * | 11/2014 | Roberts | E21B 47/1015 | 436/27 |
| 9,284,722 B2 * | 3/2016 | Heller | E03B 3/08 | |
| 9,784,061 B2 * | 10/2017 | Al-Fahad | E21B 27/02 | |
| 10,024,142 B2 * | 7/2018 | Heller | E03B 3/08 | |
| 2001/0036667 A1 * | 11/2001 | Tayebi | E21B 47/1015 | 436/56 |
| 2002/0066308 A1 * | 6/2002 | Shapiro | E21B 49/00 | 73/152.18 |
| 2003/0029995 A1 * | 2/2003 | Mullins | G01F 1/7086 | 250/302 |
| 2003/0056952 A1 * | 3/2003 | Stegemeier | E21B 43/00 | 166/250.12 |
| 2003/0066652 A1 * | 4/2003 | Stegemeier | E21B 43/12 | 166/373 |
| 2006/0046297 A1 * | 3/2006 | Ball | G01N 15/0826 | 436/28 |
| 2007/0007005 A1 * | 1/2007 | Heller | E21B 43/02 | 166/250.01 |
| 2007/0113676 A1 * | 5/2007 | Sale | B09C 1/00 | 73/861.07 |
| 2008/0314593 A1 * | 12/2008 | Vinegar | E21B 43/243 | 166/302 |
| 2009/0324337 A1 * | 12/2009 | Ball | G01N 15/0826 | 405/128.25 |
| 2010/0078372 A1 * | 4/2010 | Kerfoot | B01F 3/04262 | 210/150 |
| 2010/0206558 A1 * | 8/2010 | Lee | E21B 27/02 | 166/250.12 |
| 2011/0215234 A1 * | 9/2011 | Rose | E21B 47/1015 | 250/259 |
| 2011/0219855 A1 * | 9/2011 | Lucente | G01M 3/22 | 73/40.7 |
| 2011/0257887 A1 * | 10/2011 | Cooper | E21B 47/1015 | 702/12 |
| 2011/0290480 A1 * | 12/2011 | Al-Gouhi | E21B 33/124 | 166/250.12 |
| 2013/0017610 A1 * | 1/2013 | Roberts | C09K 11/06 | 436/27 |
| 2013/0333881 A1 * | 12/2013 | Heller | E03B 3/08 | 166/250.15 |
| 2014/0096950 A1 * | 4/2014 | Pyecroft | E21B 43/26 | 166/247 |
| 2015/0134253 A1 * | 5/2015 | Ring | E21B 47/1015 | 702/6 |
| 2016/0010454 A1 * | 1/2016 | Sira | E21B 47/1015 | 73/152.29 |
| 2016/0047682 A1 * | 2/2016 | Crawford | G01F 1/7088 | 702/47 |
| 2016/0177689 A1 * | 6/2016 | Zhang | E21B 43/14 | 702/13 |
| 2016/0348454 A1 * | 12/2016 | Al-Fahad | E21B 27/02 | |
| 2017/0241263 A1 * | 8/2017 | Heller | E21B 49/084 | |

* cited by examiner

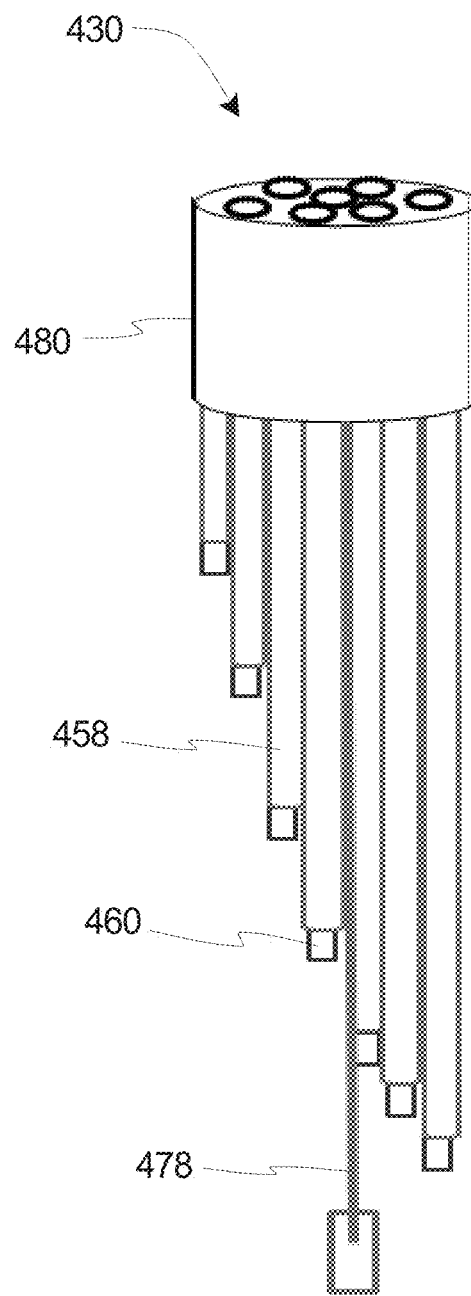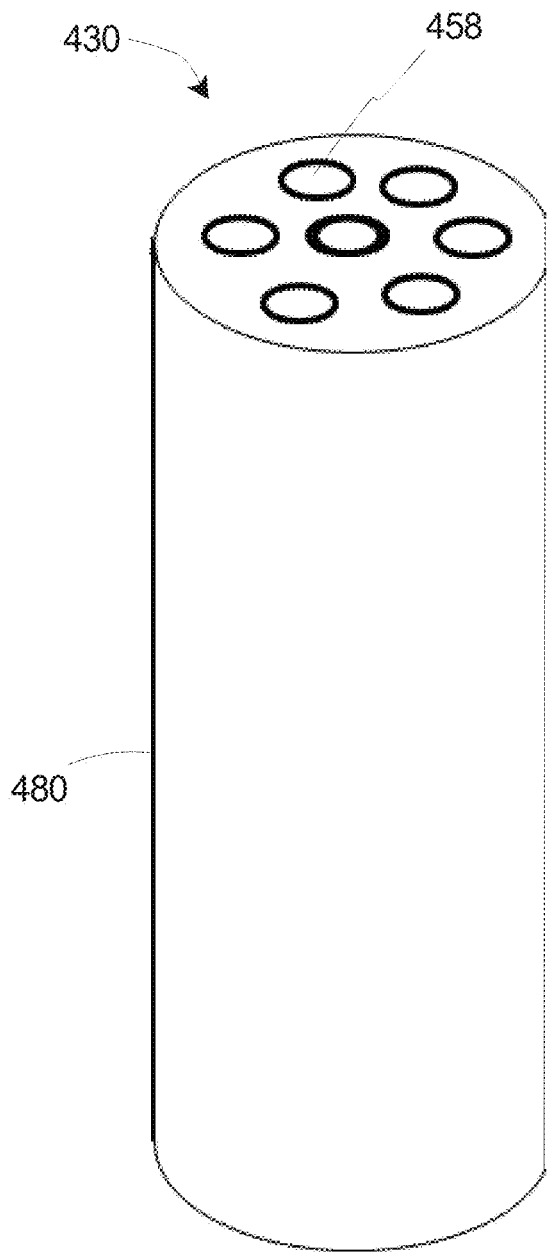
Fig. 4A
Fig. 4B

FLOWMETER PROFILING SYSTEM FOR USE IN GROUNDWATER PRODUCTION WELLS AND BOREHOLES

RELATED APPLICATION

This application claims priority on U.S. Provisional Application Ser. No. 62/302,080, filed on Mar. 1, 2016 and entitled "FLOWMETER PROFILING SYSTEM UTILIZING SUBSTANTIALLY HORIZONTALLY TRACER INJECTION FOR USE IN GROUNDWATER PRODUCTION WELLS". As far as permitted, the contents of U.S. Provisional Application Ser. No. 62/302,080 are incorporated herein by reference.

BACKGROUND

A groundwater production well (also sometimes referred to herein as a "groundwater well", a "production well", or simply as a "well") is a structure where groundwater is produced for consumption by people, for animal livestock, and for agricultural purposes, as well as industrial purposes (such as refining, mining, landfills, technology and so forth). Groundwater production wells can also include test holes for groundwater exploration. These wells consist of a support casing and well screen, through which groundwater enters the well. These wells may also be constructed in bedrock and serve the same purpose. There is also a primary pump inside the well, typically consisting of a line shaft turbine or electric submersible pump that is positioned at depth inside the well. Typically, the pump diameters are large relative to the size of the casing and well screen as well as the pump column that extends between the pump and the ground surface. Moreover, each section of pump column is connected by means of a larger diameter threaded collar. Therefore, the pump column consists of ten to twenty foot sections of pipe of a smaller diameter but terminated on each end by a collar that is at least one-half inch to one inch larger than the main section of the pipe itself.

Dynamic flow profiling of wells has been common practice for numerous years. Such flow profiling of these production wells, with various types of down-hole devices and instruments (flowmeters), is typically undertaken soon after construction of a well is completed or when a specific capacity problem arises at some point in the well's aging process. The flow profile shows the zonal flow contribution along the length of the well screen. For any new well, the flow profile will look different depending on the pumping rate, the depth location of the pump intake, and the geological properties of the surrounding formational materials (such as permeability, angularity, fracture and fault structures, etc.), as well as a result of hydraulic interferences from pumping wells located in close proximity of the well where the flow meter survey is being performed. Well aging can also affect the morphological manifestation of the flow distribution profile. This is because wells typically become increasingly clogged over time from buildup of mineralization deposits, sediment infill and biological matter inside the well screen and surrounding gravel pack, to the degree that specific capacity and zonal flow contribution of the well changes and decreases over time.

Specific capacity (SC) is defined by the number of gallons per minute (GPM) that the well produces per foot of drawdown inside the well when it is pumping at a constant rate. For example, when the well is pumping at 1,000 GPM with 50 feet of drawdown inside the well, the SC of the well is equal to 20 GPM/foot drawdown—or simply referred to as SC=20. As the well ages, for example, the SC may incrementally decrease to 4; meaning that there is 250 feet of drawdown of the pumping water level to maintain the pumping rate at 1,000 GPM. This type of low SC value can be alarming in terms of the financial bottom line of the producer since the lower the SC, the greater the consumption of electricity due to an increase in total dynamic head (TDH). TDH is equal to the vertical distance between the pumping water level and the ground surface.

When such decreases in SC are found within an aging well, it can be desired to attempt to rehabilitate the well. The intention of the rehabilitation process is to restore as much SC to the well as possible. However, the reality is that SC is never completely restored, but can only be recovered to a percentage of the original value. While a decrease in drawdown during pumping at a constant rate is one metric of the well's SC improvement from the rehabilitation process, another metric is the improvement in zonal yield (ZY) and zonal specific capacity (ZSC). The most tried and true method of measuring the improvement in ZY and ZSC is through performance of the down-hole flow metering survey inside the well, along the entire length of the well screen. Performing the flow metering survey on the basis of just before and just after the rehabilitation process is very useful for measuring the zonal improvements, section by section along the length of the well screen.

The difference between the ZY and ZSC before and after the rehabilitation process is an important metric by which the producer can gauge the effectiveness of the rehabilitation being performed. Thus, such a comparison can be used as a means of evaluating contractual performance objectives for the company that has been contracted to perform the rehabilitation. Some rehabilitations are relatively simple and inexpensive, such as rehabilitations merely consisting of mechanical wire brushing of the inside of the well. However, other types of rehabilitation problems can be much more complex and costly when significant clogging of the gravel pack is involved. Gravel pack clogging problems often require acoustical and/or chemical treatments on a single or even repeat basis before reaching a rehabilitation performance level where the SC is sustainable over a prolonged period of time (typically measured in years). However, the interpretation of the before and after flow metering survey results can be problematic as a result of internal well roughness and high velocity water jets entering the well, thus overprinting aberrant water-jet velocities onto the normal pumping velocity gradient inside the well. These aberrant velocities often lead to (falsely) negative flow results implying that groundwater is actually leaving the well in certain zones during constant rate pumping.

To make matters even more complex and riddled with error, the flow metering surveys performed inside wells are typically not centralized within the well. Instead, it is a typical practice to insert the flow metering instrument along one side of the well. This can be done through either an external camera tube that enters the well below the pump intake, or through a large diameter PVC pass through pipe inside the well that runs alongside the pump column, bowls and intake, with an entry point somewhere below the pump intake and above the well screen. A common tool used for flow profiling is a spinner log tool. However, when an internal, large diameter (e.g., two inches to four inches in diameter) PVC pipe is used to allow access of a spinner log tool into the well, the primary pump cannot be used for the spinner log survey, since there is not enough diameter inside the well to accommodate both the PVC pipe and the primary pump. Therefore, an added expense to the process of the flow metering survey is for the potential use of a test pump, the rental of which from a local pump service company can typically cost tens of thousands of dollars.

In either entry process described above, the spinner log tool typically begins at a decentralized starting point on one side of the well and often gradually shifts to the other side of the well (and even back again to the original side) during its survey descent. Tool drift stems from the fact that in almost every case, wells are not plumb (i.e. precisely vertical), but instead deviate from plumb by two or more degrees. Therefore, the decentralized survey is being conducted through varying flow regimes inside the well commonly referred to as the boundary layer (i.e. near or adjacent to the support casing or well screen), the transitional zone, and the axial trace (i.e. toward or at the center of the well) of fluid flow. The fluid velocity in each zone is different, with the boundary layer producing the slowest velocities and the axial trace producing the fastest velocities.

In order to avoid measuring varying velocity regimes inside of a production well, the spinner log tool can be deliberately centralized using a centralizer device whereby the spinner log tool follows a fixed axial path inside the well. So, although the device is only measuring the fastest in-well velocities (i.e. in the axial trace), correction factors can be used to derive the bulk average flow rate, since the error is a constant. These correction factors cannot be used when the tool is drifting from one side to the other side of the well since the error is not a constant resulting from tool drift in the x-y cross-sectional plane of the well. The level of error that can result from tool drift can be as much as fifty percent (50%) in terms of underestimating or overestimating zonal flow.

All of the factors that contribute to these measurement errors can cause large uncertainties in whether or not the data is reliable and acceptable for use as a performance metric for measuring pre-rehabilitation and post-rehabilitation zonal flow results. But, the fact of the matter is that the dynamic, steady-state flow metering tests must be performed with a pump inside the well, which leads to the decentralized position of the spinner log or other types of flow metering devices. To deal with such decentralization problems, spring-loaded centralizers have been developed, whereby the centralizer can be triggered to expand once the device is inside the well and below the pump intake. Supposedly, these devices can also be remotely retracted in order to remove the device. However, the situation happens often enough where the centralizer does not either expand or collapse as desired. In the case of a camera tube entry scenario and where the spring-loaded centralizer does not collapse, the flow metering tool can then easily get stuck inside the well, which can result in serious cost ramifications. As an example, the camera tube may become compromised to the point where it can no longer be used for video inspection of the inside of the well. Such video inspections are useful in conjunction with SC measurements to determine when a well should be rehabilitated. However, if the camera tube is no longer accessible, the primary pump must be removed before the camera survey can commence. Given the risk of compromising the functionality of the camera tube, the spring-loaded centralizers are typically not used and the decentralized flow metering results considered to be good enough.

Another application of flow profiling of pumping production wells is the use of such data in combination with depth-dependent, co-located water chemistry samples whereby the cumulative results can be flow-weighted through integration of the depth-dependent cumulative flow data. This algebraic transformation provides the zonal chemical distribution for any analyte or water characteristic of concern in association with the volume of groundwater produced from each of these zones. The benefit of this application is for purposes of modifying the internal fluid entry hydraulics of the well to inhibit groundwater of undesirable water quality from entering the well from specific formational zones. These manipulations can therefore reduce the amount of contaminant mass discharging from the well, such that no or a reduced amount of treatment and/or blending of the water from the well may be required over time.

In each application explained above (i.e. flow only and flow combined with water quality), there is significant room for error and costly mistakes from the flow meter results that are a subject of concern and confusion for producers and the hydrogeological and engineering professionals that provide (potentially low confidence) interpretation and meaning of such data. It is important to emphasize that the goal of the flow metering survey under both dynamic (pumping) and ambient (non-pumping) steady-state conditions is to determine a reliable value of the bulk average flow rate at any point inside the well. Such data then leads to credible performance metric evaluations for rehabilitation, as well as success solutions for inhibiting groundwater of undesirable water quality from entering the well.

SUMMARY

The present invention is directed toward a flowmeter profiling system for measuring a flow profile of water in a subsurface environment. In various embodiments, the flowmeter profiling system includes a tracer injection system positioned at least partially within the subsurface environment. The tracer injection system includes an injection tube that contains a tracer material, and an injection port that is coupled to the injection tube near a bottom of the injection tube. Additionally, the injection port is configured to inject the tracer material substantially horizontally into the subsurface environment, i.e. substantially perpendicular relative to a longitudinal axis of the groundwater production well or borehole at the point of injection within the subsurface environment.

In some embodiments, the injection port includes a plurality of exit holes. In such embodiments, the tracer material is injected substantially horizontally into the subsurface environment through each of the plurality of exit holes.

Additionally, in certain applications, the water is in a groundwater production well having a cross-sectional plane, and the tracer material is injected substantially horizontally into the groundwater production well through each of the plurality of exit holes to fill substantially the entire cross-sectional plane of the groundwater production well. In certain embodiments, the groundwater production well includes a support casing and a well screen that are positioned within the subsurface environment. In such embodiments, the flowmeter profiling system further includes a primary pump that is positioned within the groundwater production well, the primary pump defining at least a portion of an annulus between the primary pump and one of the support casing and the well screen. Further, in such embodiments, the injection tube can be positioned within the groundwater production well and below the primary pump via the annulus, and without removing the primary pump from the groundwater production well. Alternatively, the injection tube can be positioned within the groundwater production well and below the primary pump via an access pipe that is positioned between the primary pump and one of the support casing and the well screen.

In some embodiments, the tracer injection system is a single-depth tracer injection system that is configured such that each of the plurality of exit holes is positioned at a first depth within the subsurface environment. The tracer material is injected into the subsurface environment through each of the plurality of exit holes at the first depth. Additionally, the single-depth tracer injection system can be used consecutively at multiple depth locations within the subsurface environment to measure the flow profile of the water at various depths throughout the subsurface environment without removing the single-depth tracer injection system from the subsurface environment. Further, in certain embodiments, the tracer injection system further includes a tracer detector that is positioned at a surface above the subsurface environment, and the tracer detector detects the presence of the tracer material within the water to measure the flow profile of the water within the subsurface environment. Additionally and/or alternatively, the tracer injection system can further include a down-hole tracer detector that is coupled to the injection tube within the subsurface environment, and the down-hole tracer detector can detect the presence of the tracer material within the water to measure the flow profile of the water within the subsurface environment.

Additionally, in some embodiments, the tracer injection system is a multi-depth tracer injection system that further includes a second injection port that is coupled to the injection tube, the second injection port being spaced apart from the injection port along a length of the injection tube. In such embodiments, the injection port is configured to inject the tracer material substantially horizontally into the subsurface environment at a first depth, and the second injection port is configured to inject the tracer material substantially horizontally into the subsurface environment at a second depth that is different than the first depth. In such embodiments, the tracer injection system can include a surface-based tracer detector that is positioned at a surface above the subsurface environment and/or a down-hole tracer detector that is coupled to the injection tube within the subsurface environment. In either embodiment, the tracer detector detects the presence of the tracer material within the water to measure the flow profile of the water within the subsurface environment at each of the first depth and the second depth.

Further, in still other embodiments, the tracer injection system is a multi-depth tracer injection system that further includes a second injection tube that contains the tracer material, and a second injection port that is coupled to the second injection tube near a bottom of the second injection tube, the second injection port being configured to inject the tracer material substantially horizontally into the subsurface environment. In such embodiments, the injection port is configured to inject the tracer material substantially horizontally into the subsurface environment at a first depth, and the second injection port is configured to inject the tracer material substantially horizontally into the subsurface environment at a second depth that is different than the first depth. The injection tube and the second injection tube can be conjoined together within a single jacket. In such embodiments, the tracer injection system can include a surface-based tracer detector that is positioned at a surface above the subsurface environment and/or a down-hole tracer detector that is coupled to one of the injection tube and the second injection tube within the subsurface environment. In either embodiment, the tracer detector detects the presence of the tracer material within the water to measure the flow profile of the water within the subsurface environment at each of the first depth and the second depth.

In certain embodiments, the flowmeter profiling system further includes a primary pump that is positioned within the subsurface environment, and the tracer injection system includes the injection tube being positioned within the subsurface environment such that the injection port is positioned below the primary pump. The primary pump can then be turned on to pump the water within the subsurface environment such that the flowmeter profiling system measures a dynamic flow profile of the water in the subsurface environment.

Additionally, in some embodiments, the tracer material has a specific gravity that is approximately equal to a specific gravity of the water within the subsurface environment. Further, a rate at which the tracer material becomes diluted and asymptotically approaches a specific gravity of the water within the subsurface environment can be substantially instantaneous.

The present invention is further directed toward a water sampling assembly for use within a subsurface environment, the water sampling assembly including a water sampler that samples water within the subsurface environment, and the flowmeter profiling system as described above that measures a flow profile of the water in the subsurface environment.

Additionally, the present invention is also directed toward a method for measuring a flow profile of water in a subsurface environment, including the steps of (i) positioning a tracer injection system at least partially within the subsurface environment, the tracer injection system including an injection tube that contains a tracer material, and an injection port that is coupled to the injection tube near a bottom of the injection tube; and (ii) injecting the tracer material substantially horizontally into the subsurface environment with the injection port.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 4A is an enlarged schematic perspective view illustration of a portion of an embodiment of the multi-depth tracer injection system;

FIG. 4B is an enlarged schematic perspective view illustration of another portion of the multi-depth tracer injection system illustrated in FIG. 4A;

DESCRIPTION

Embodiments of the present invention are described herein in the context of a flowmeter profiling system for use within a groundwater production well or borehole. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar nomenclature and/or reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1A:
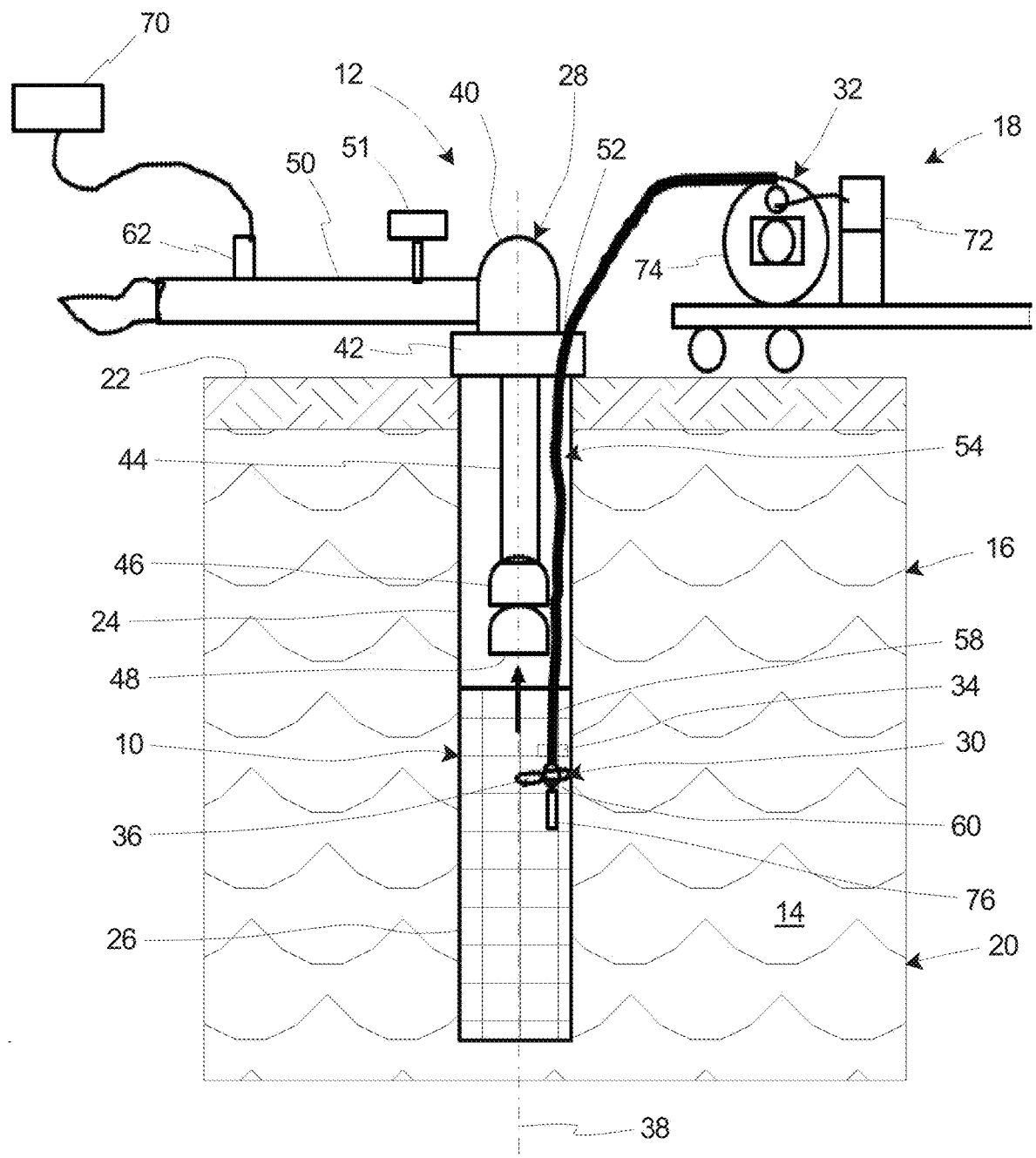
FIG. 1A is a simplified schematic illustration of a groundwater production well and an embodiment of a flowmeter profiling system having features of the present invention that is positioned at least partially within the groundwater production well, the flowmeter profiling system including a single-depth tracer injection system.

FIG. 1A is a simplified schematic illustration of a groundwater production well 10 (also sometimes referred to herein as a "groundwater well", a "production well", or simply as a "well"), and an embodiment of a flowmeter profiling system 12 having features of the present invention that is positioned at least partially within the groundwater production well 10. As illustrated, the groundwater production well 10 provides access to one or more fluids, e.g., groundwater 14 (or sometimes simply referred to as "water"), that are present within a subsurface environment 16.

It is appreciated that although the description provided herein is primarily focused on access to and profiling the flow of groundwater 14, the present invention can also be applied for purposes of accessing and profiling the flow of other types of fluids.

Additionally, it is also appreciated that the flowmeter profiling system 12 described herein can also be applied to uncased boreholes where fluids are produced directly into the borehole from surrounding fractured bedrock materials. As such, any reference herein to use of the flowmeter profiling system 12 within a groundwater production well is understood as being equally applicable for use within such uncased boreholes.

The groundwater well 10 can be installed using any one of a number of methods known to those skilled in the art. In non-exclusive, alternative examples, the groundwater well 10 can be installed with hollow stem auger, sonic, air rotary casing hammer, dual wall percussion, dual tube, rotary drilling, vibratory direct push, cone penetrometer, cryogenic, ultrasonic and laser methods, or any other suitable method known to those skilled in the art of drilling and/or well placement.

As illustrated, the groundwater well 10 can be said to include a surface region 18 and a subsurface region 20. The surface region 18 is an area that includes the top of the groundwater well 10 which extends to and/or is positioned above a surface 22. The surface 22 can either be a ground surface or the surface of a body of water or other liquid, as non-exclusive examples. The subsurface region 20 is the portion of the groundwater well 10 that is below the surface 22 and below the surface region 18, e.g., at a greater depth than the surface region 18.

Additionally, as illustrated, the groundwater well 10 includes a support casing 24 and a well screen 26. The support casing 24 can be a hollow, generally cylinder-shaped structure that extends in a generally downward direction into the subsurface region 20 to help provide access to the groundwater 14, and/or other fluids and materials present within the subsurface region 20. The support casing 24 can have any desired thickness and can be formed from materials such as polyvinylchloride (PVC), other plastics, fiberglass, ceramics, metal, or other suitable materials. Additionally, the length of the support casing 24 can be varied to suit the specific design requirements of the groundwater well 10 and/or depending on the specific locations of the desired groundwater 14, and/or other fluids and materials within the subsurface environment 16. Further, an inner diameter of the support casing 24 can vary depending upon the specific design requirements of the groundwater well 10 and/or the flowmeter profiling system 12. It is understood that although the support casing 24 is illustrated in the Figures as being positioned substantially vertically (i.e. straight up-and-down within the subsurface environment 16), the support casing 24 and the other structures of the groundwater well 10 can alternatively be positioned at any suitable angle relative to vertical.

The well screen 26 extends from and/or forms a portion of the support casing 24 within the subsurface environment 16. The well screen 26 can comprise a perforated pipe that provides an access means through which the groundwater 14 enters the well 10. As illustrated, the well screen 26 is adapted to be positioned at a level within the subsurface environment 16 in vertical alignment with and/or substantially adjacent to the groundwater 14 within the subsurface region 20. It is noted that although the well screen 26 is shown as extending in a substantially continuous manner adjacent to the groundwater 14 within the subsurface region 20; the well screen 26 can alternatively be positioned in a more discretized manner, such that the well screen 26 is provided in a number of individual sections that are positioned only in vertical alignment with and/or substantially adjacent to certain portions of the groundwater 14.

The design of the flowmeter profiling system 12 can be varied depending on the specific requirements and characteristics of the groundwater production well 10, and/or depending on the specific availability of the groundwater 14 within the subsurface environment 16. In various embodiments, as shown in FIG. 1A, the flowmeter profiling system 12 includes a primary pump assembly 28 (also referred to herein as the "primary pump" or simply the "pump"), a tracer injection system 30, and a control system 32. Additionally and/or alternatively, the flowmeter profiling system 12 can include more components or fewer components than those specifically illustrated and described in relation to FIG. 1A. For example, in certain non-exclusive alternative embodiments, the flowmeter profiling system 12 can further include and/or be used in conjunction with a water sampler 34, e.g., a miniaturized sampling pump, a bailer, or a grab sampler, that obtains or collects water samples from within the subsurface environment 16. In such embodiments, the combination of the flowmeter profiling system 12 and the water sampler 34 can be referred to generally as a "water sampling assembly".

As provided herein, the flowmeter profiling system 12 addresses one or more of the potentially significant error problems described above. More specifically, in various embodiments, the flowmeter profiling system 12 includes a tracer injection system 30 utilizing a non-toxic, non-carcinogenic tracer material 36 (sometimes referred to herein simply as "tracer") that is injected substantially horizontally or sideways from multiple exit points in order to measure flow of the groundwater 14 through the entire cross-sectional plane of the well 10 at any desired depth. In certain embodiments, the tracer 36 is injected substantially orthogonal to a longitudinal axis 38 of the support casing 24. With such design, there is no need to specifically centralize the tracer injection system 30 within the well 10 while still enabling an accurate flow profile, i.e. zonal flow, through the entire cross-sectional plane of the well 10. Additionally, in many embodiments, the down-hole portion of the tracer injection system 30 is small enough that it can be installed into the well 10 and below the primary pump 28 without the need for removing the primary pump 28 from the well 10. Alternatively, in other embodiments, an access pipe (not shown in FIG. 1A) may be provided through which the down-hole portion of the tracer injection system 30 can be installed into the well 10 and below the primary pump 28. In either situation, the flow profiling can be undertaken with the primary pump 28 operating so as to provide the actual pumping rate and geometry to create the exact conditions inside the well 10 that will occur during regular operation of the well 10. Thus, the flowmeter profiling system 12 can also realize certain cost-efficiency advantages in comparison to currently available systems.

As utilized herein, the reference to the tracer material 36 being injected substantially "horizontally" or "sideways" signifies that the tracer material 36 is being injected substantially perpendicular (or orthogonal) relative to the longitudinal axis 38 of the support casing 24 or well screen 26 of the groundwater production well 10, or a longitudinal axis of the outer confines of the uncased borehole, at the point of injection. Additionally, a substantially horizontal injection of the tracer material 36 further signifies that the tracer material 36 is being directed substantially directly from the injection port 60 toward the support casing 24 or well screen 26 (or outer confines of the borehole) in the specific direction that the tracer material 36 is being directed and at the point or depth of injection. It is recognized that the support casing 24 or well screen 26 may not be precisely vertical at all locations throughout the well 10. In fact, the support casing 24 or well screen 26 may be off-vertical by several degrees (or more) at certain locations along the depth of the well 10. However, it is the intent of the flowmeter profiling system 12 disclosed herein for the tracer material 36 to be injected substantially perpendicularly to the longitudinal axis 38 of the support casing 24 or well screen 26 of the groundwater production well 10, or a longitudinal axis of the outer confines of the uncased borehole, at the point of injection.

In the embodiment illustrated in FIG. 1A, the flowmeter profiling system 12 includes a single-depth tracer injection system 30. In this embodiment, the tracer injection system 30 can be used consecutively at multiple depth locations in order to measure the fluid flow at various depths throughout the well 10. Alternatively, in other embodiments, the tracer injection system 30 can be a multi-depth tracer injection system that can measure the fluid flow at multiple depths within the well 10 substantially simultaneously and/or without having to move the tracer injection system 30 within the well 10 in order to measure the fluid flow at the desired different depths.

The primary pump 28 provides a means to selectively remove the groundwater 14 from the groundwater well 10. As illustrated, the primary pump 28 can include a pump head 40, a pump support plate 42 (also sometimes referred to herein as a "support plate"), a pump column 44, one or more impeller pump bowls 46 (also referred to herein simply as "pump bowls"), and a pump intake 48. Additionally, the primary pump 28 can further include pump collars (not shown) that connect different sections of the pump column 44 to one another. Alternatively, the primary pump 28 can have a different design. For example, the primary pump 28 can be designed with greater or fewer elements than those specifically illustrated in FIG. 1A.

In this embodiment, the pump head 40 is positioned above the surface 22 and houses a pump motor (not illustrated) and a portion of a discharge pipe 50 (a portion of the discharge pipe 50 is illustrated extending to the left in FIG. 1A away from the pump head 40). As taught in various applications of the present invention, the pump motor selectively activates the primary pump 28 such that the level of the groundwater 14 can be adjusted within the subsurface region 20. Additionally, as illustrated, a flow meter 51 can be coupled to the discharge pipe 50, which can be used to regulate and/or measure the volume of flow of the groundwater 14 that is moved through and out of the discharge pipe 50, e.g., into a groundwater distribution system (not shown) or into a waste water system (not shown).

The support plate 42 supports the pump head 40. Additionally, the support plate 42 can further support other portions of the primary pump 28 that are coupled to the pump head 40. As illustrated, in one embodiment, the support plate 42 can be positioned substantially adjacent to the surface 22 and can support the pump head 40 above the surface 22. Additionally, in certain embodiments, the support plate 42 can provide an access port 52 for the tracer injection system 30 to be inserted into the groundwater well 10 past the primary pump 28.

It may be desired to have different possibilities within the flowmeter profiling system 12 as to what can function as the access port 52 to enable the tracer injection system 30 to be inserted into the groundwater well 10 and positioned below the primary pump 28. For example, in certain non-exclusive alternative embodiments, the access port 52 can be provided by a support aperture, e.g., a vent pipe, a bolt hole and/or a drilled hole that extends through the support plate 42; a water level measurement port, which typically provides access for a transducer that can be used to measure the fluid level within the well 10; and/or a camera tube, which typically provides a means for visually observing, e.g., with a camera, what is going on within the well 10. Alternatively, the access port 52 can be provided in a different manner than described herein.

The pump column 44 is coupled to the pump head 40 and extends in a generally downward direction away from the pump head 40 into the subsurface region 20 of the groundwater well 10. The pump column 44 can be of any desired length depending on the specific requirements of the groundwater well 10 and/or the location of the groundwater 14 within the well 10.

As illustrated, the pump bowls 46 can be positioned at, near and/or adjacent to the end of the pump column 44 away from the pump head 40. Additionally, as shown, the pump bowls 46 can have the largest diameter of any portion of the primary pump 28 that is positioned within the subsurface region 20. Typically, the largest diameter of the primary pump 28 within the subsurface region 20 is fairly large relative to the size of the support casing 24 and the well screen 26, such that there is relatively small spacing, or annulus 54, between the primary pump 28 and the support casing 24 and/or the well screen 26.

In the embodiment illustrated in FIG. 1A, the pump intake 48 is an opening for the groundwater 14 to enter the pump column 44 and thereafter be transported to the surface 22 where the groundwater 14 can be removed via the discharge pipe 50. In one embodiment, the pump intake 48 can be positioned substantially adjacent to the pump bowls 46. Alternatively, the pump intake 48 can be positioned at a different location within the groundwater well 10, i.e. away from the pump bowls 46.

The depth set location of the pump intake 48 is derived from many factors that come into play such as 1) the depth of the groundwater 14 within the subsurface region 20, 2) the pumping fluid level, 3) the rate of declining water table within the subsurface region 20, 4) the rate of recharge of the groundwater 14 within the subsurface region 20, 5) the depth of the target zones from which the flow of groundwater 14 is to be profiled, and/or 6) the storage and transmissivity of the groundwater 14 within the subsurface region 20.

As noted herein above, the flowmeter profiling system 12 can be configured to overcome many of the drawbacks that exist in current systems. For example, in various embodiments, the tracer injection system 30 can provide significant improvements in the areas of accuracy, time-efficiency and cost-efficiency for the flowmeter profiling system 12 in comparison to existing systems. In some embodiments, to better achieve the desired time-efficiency and cost-efficiency goals, if the down-hole portion of the tracer injection system 30 is small enough it can be desired to install that portion of the tracer injection system 30 via the annulus 54 into the well 10 and past the primary pump 28 without removing the primary pump 28 from the well 10 and/or with the primary pump 28 positioned at least partially therein. As noted, the annulus 54 is the space between the primary pump assembly 28 (e.g., the pump column 44, the pump collars and the pump bowls 46) and the support casing 24 and well screen 26. As an example, a twelve-inch pump assembly 28 can be placed inside of a sixteen-inch support casing 24 and/or well screen 26. If the pump assembly 28 is perfectly centered inside the well 10, there would be a two-inch annulus 54 around the outside of the primary pump assembly 28. Because wells are rarely straight, the pump assembly 28 and pump column 44 commonly veers to one side of the well 10 with increasing depth such that the annulus 54 can be relatively small on one side of the primary pump 28 and larger on the other side. Even still, there are many cases in which the down-hole portion of the tracer injection system 30 can pass by the primary pump 28 and into the section of well 10 below the pump intake 48 provided that they pass by the primary pump 28 on the side with the larger annular space.

Additionally and/or alternatively, in certain non-exclusive alternative embodiments, e.g., when the annulus 54 is too small to enable proper or reliable insertion of the tracer injection system 30 into the groundwater well 10 and past the primary pump 28, an access pipe 256 (illustrated in FIG. 2) can be installed that extends from the surface to some distance past the pump intake 48 at depth. More particularly, in such embodiments, the well owner can remove the primary pump 28 from the well and install a small diameter access pipe 256 (e.g., from 0.75 inches to 1.25 inches inside diameter) that extends from the surface 22 to some distance past the pump intake 48 at depth. The down-hole portion of the tracer injection system 30 can then be installed into the groundwater well 10 and past the primary pump 28 via the access pipe 256.

In the embodiment illustrated in FIG. 1A, the tracer injection system 30 includes a small diameter injection tube 58 that is filled with tracer material 36, a miniaturized injection port 60 coupled to the injection tube at or near a bottom of the injection tube 58, and a tracer detector 62.

The injection tube 58 is coupled to the control system 32 and extends downward from the surface 22 into the well 10 and past the primary pump 28. The injection tube 58 provides a conduit and receptacle for the tracer material 36 that is moved down into the well 10 and ultimately injected into the groundwater 14 within the well 10.

Flow production inside of a pumping well 10 (e.g., along the length of the well screen 26) can be measured by means of the tracer material 36 that can be released into the well 10 at different depths. The tracer material 36 typically includes one or more fluorescent dyes, particularly those which are non-toxic and not visible, in order to provide water discharge and velocity data. Additionally, in various embodiments, the injected tracer material 36 is suitable for use in potable drinking water wells. In some embodiments, the tracer material 36 used for the desired flow measurements can include a material that has been approved by the National Sanitation Foundation and is referred to as NSF/ANSI 60. Additionally and/or alternatively, the tracer material 36 can include another substance that has been approved by the NSF or some other organization or agency. For example, in certain non-exclusive alternative embodiments, the tracer material 36 can include a substance referred to as rhodamine red FWT 50—which is nontoxic, non-carcinogenic and biodegradable. Still alternatively, the tracer material 36 can include another suitable material or substance.

In certain embodiments, the tracer material 36 works most efficiently and effectively if one or more particular features are present, although none of the features listed below are specifically required for proper functioning of the tracer 36 and/or the tracer injection system 30. First, the specific gravity of the tracer material 36 can be very close to or substantially similar to the water when it is mixed with water. For example, in certain non-exclusive alternative embodiments, the specific gravity of the tracer material 36 can be less than approximately 1%, 2%, 3%, 4%, 5%, 6%, 7%, 8%, 9%, or 10% different than the specific gravity of the water (or other fluid) with which the tracer material 36 is mixed. Second, the radial spread of the tracer 36 can cover the entire cross-sectional plane of the well 10 at any injection depth. For example, as described in greater detail herein below, in some embodiments, the tracer material 36 can be injected into the well substantially horizontally and in multiple directions. Third, the rate at which the tracer 36 becomes diluted and asymptotically approaches the specific gravity of water can be nearly instantaneous. Fourth, as described in greater detail herein below, the injection tube 58 of the tracer injection system 30 can be weighted in order to maintain straightness of the injection tub 58 strand inside the well 10.

The combination of the first three factors allows the tracer 36 to move at the same rate as water travelling through the well 10. This enables an accurate water velocity to be measured at any depth within the well 10. Moreover, from the measured velocities, the bulk average and cumulative flow rate can also be determined at any depth inside the well 10. Additionally, in various embodiments, the fourth factor described above can be important in that the suction force of the pump 28 should not make the injection tube 58 become buoyant at any depth. In some embodiments, the counter weight is heavy enough that the injection tube 58 remains relatively straight during the entire survey or various parts of the survey. Otherwise, the injection port 60 can ascend or float to a different depth other than what is indicated on the tubing counter and lead to an error in the survey results.

Figure 1B:
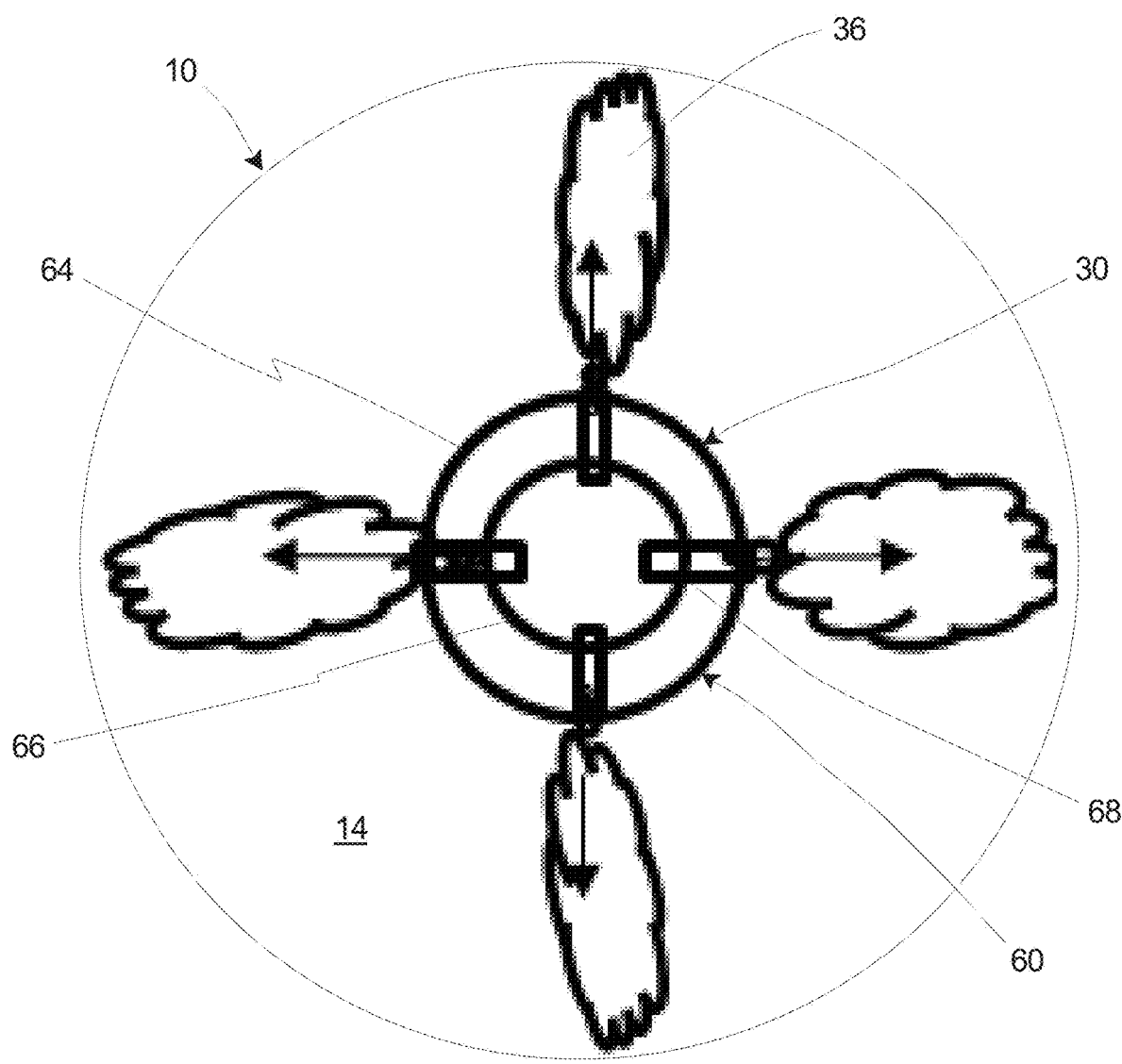
FIG. 1B is an enlarged schematic top view illustration of a portion of the tracer injection system illustrated in FIG. 1A.

FIG. 1B is an enlarged schematic top view illustration of a portion of the tracer injection system 30 illustrated in FIG. 1A. In particular, FIG. 1B illustrates a simplified schematic top view of the injection port 60 that is used to inject the tracer material 36 into the well 10 at desired depths.

In certain embodiments, the injection port 60 includes a small diameter (e.g., less than one inch), short, one-way injection valve 64 (less than three inches long) that is connected to a cylinder 66 of the same or smaller diameter, and that is shorter in length than the injection valve 64. The cylinder 66 has an open side that is attached to the bottom end of the injection valve 64. The bottom, opposite side of the cylinder 66 is covered, with no exit point. The curved wall of the cylinder 66 has multiple exit holes 68 that are circumferentially spaced around the cylinder 66. These exit holes 68 allow the tracer 36 to exit the cylinder 66, simultaneously at multiple points, and in a substantially horizontal (also sometimes referred to herein as "sideways") direction into the well 10 at each point. The substantially horizontal, radial release of the tracer 36 through multiple exit holes 68 around the small cylinder 66 allows a substantial, if not the entire, cross-sectional area of the well 10 to be filled or flooded with the tracer 36 to enable the bulk average flow rate of water through this plane to be measured. With this design, the bulk average flow rate of the groundwater 14 can still be effectively measured even when the tracer injection port 60 is not centralized inside the well 10. As the tracer 36 radially spreads through the groundwater 14 at any injection depth, the tracer 36 almost instantly covers groundwater 14 moving through the boundary layer, the transitional zone and the axial trace of a pumping (or a non-pumping) well 10.

The number of exit holes 68 through which the tracer material 36 is injected into the well 10 can be varied. For example, as illustrated in FIG. 1B, the cylinder 66 can include four exit holes 68 through which the tracer material 36 is injected into the well 10. Alternatively, the cylinder 66 can include more than or less than four exit holes 66. In certain non-exclusive alternative embodiments, the cylinder 66 can include two, three, five, six, seven, eight, nine or ten exit holes 68 through which the tracer material 36 is injected into the well 10. As noted, the use of multiple exit holes 68 better enables the tracer material 36 to fill most if not all of the cross-sectional area of the well 10, which better enables the tracer injection system 30 to accurately measure the bulk average flow rate of the groundwater 14 at the various desired depths within the well 10.

Returning now to FIG. 1A, at the surface 22, the tracer detector 62, e.g., a fluorometer, can be attached to a sample spigot located in close proximity to the discharge head of the well 10. As used herein, the term "fluorometer" is a device that allows measurement of ultra-low concentrations of the tracer 36 in the groundwater 14 within the well 10.

When the tracer 36 is injected at any depth, the release time is time stamped by the fluorometer 62 and/or a computing device 70 (such as a laptop, smart phone, tablet, or another suitable device) that is connected thereto, and can be manually entered by the field operator or automatically stored in the computing device 70. The return of the tracer 36 to the fluorometer 62 at the surface 22 is also time stamped by the fluorometer 62 and/or by the computing device 70, and can be manually recorded on the field data sheet, or automatically stored in the computing device 70. As utilized herein, the return time or "return" for the tracer material 36 is the time when the tracer material 36 is specifically detected within the water by the tracer detector 62 or fluorometer.

By knowing the travel time of the tracer 36 back to the tracer detector 62 from each release point, knowing the depth of each release point, and knowing the cross-sectional surface area of the well 10 at each release point, the Continuity Equation can be applied to determine the volume and percentage of cumulative flow from each pair of consecutive release points. Subsequently, iterative algebraic subtraction between sequential pairs of cumulative flow values yield zonal contributions of fluid volume entering the well 10 over a given period of time (e.g., in gallons per minutes (GPM)). Once the flow values are derived from the use and application of the tracer injection system 30, the cumulative flow data is integrated within the mass balance equation such that the associated cumulative chemistry at each depth is flow weighted through an iterative calculation. In this way, the zonal chemistry associated with each flow contribution zone is derived.

The injection of the tracer material 36 at each depth is repeated once, or multiple times, to determine reproducibility of the in-well flow velocity measurement. If the measurement is reproducible, the injection tube 58 and injection port 60 is then lowered to the next depth and the process is repeated. This process continues until all of the depths of interest for the flow survey are completed. The injection tube 58 itself of the tracer injection system 30 moves through a mechanical or optical counter at the surface 22 such that each injection depth can be tracked and recorded.

In particular, solving for velocity between any two injection depths can be expressed by, $$V=(d_1-d_2)/(t_1-t_2) \qquad \text{(Equation 1)}$$

where, $d_1$=injection depth 1
$d_2$=injection depth 2

$t_1$=tracer travel time from release depth to fluorometer detection from $d_1$ $t_2$=tracer travel time from release depth to fluorometer detection from $d_2$ When the velocity (V) is multiplied by the cross-sectional area of the well's inside diameter, the cumulative bulk average flow rate through the imaginary plane can be derived by, $$Q=V \times A \quad \text{(Equation 2)}$$

where, $A=\pi r^2$=cross-sectional area of the well r=radius of the well

Additionally, when the difference between any sequentially, consecutive pair of cumulative flow values are calculated, the difference between the two flow values equals the zonal contribution between the two injection depths.

In certain alternative embodiments, the tracer detector 62 can have a different design than what has been described in detail herein.

In some embodiments, the control system 32 can include a computerized system having one or more processors and circuits, and the control system 32 can be programmed to perform one or more of the functions described herein. It is recognized that the positioning of the control system 32 within the flowmeter profiling system 12 can be varied depending upon the specific requirements of the flowmeter profiling system 12. In other words, the positioning of the control system 32 illustrated in FIG. 1A is not intended to be limiting in any manner.

The control system 32 can control and/or regulate various processes related to the profiling of the flow of the groundwater 14 at various desired depths within the groundwater production well 10. For example, the control system 32 can be used to control the administration of the tracer injection system 30 within the groundwater well 10, as well as for processing the results obtained from the tracer injection system 30 in order to calculate and/or derive the flow of the groundwater 14 at various depths within the groundwater well 10.

The surface-based technology included within the control system 32 for injecting the tracer 36 into the well 10 can consist of any type of apparatus and method that is used to hydraulically feed tracer material 36 to the tracer injection tube 58, provided that the release of the tracer material 36 is substantially instantaneous into the well 10 and forceful enough to cover substantially the entire cross-sectional area of the well 10 at any given injection depth. For example, in one non-exclusive alternative embodiment, the control system 32 can include a tracer injection control apparatus that forces the tracer material 36 into the injection tube 58 by means of an injection motor and pump. The forcing of the tracer material 36 into the injection tube 58 thus forces the tracer material 36 through each of the exit holes 68 of the injection port 60 and into the well 10, i.e. to fill most if not all of the cross-sectional area of the well 10.

Additionally, the control system 32 can further be configured to inhibit air bubbles from entering into the injection tube 58. Air bubbles can be problematic in that they can interfere with the recorded release time of the tracer 36 into the well 10. In other words, air bubbles can create a delay in the tracer release time since the air bubbles are compressible. As an example, if the tracer release time is 9:00:00 AM, the presence of air bubbles would likely cause a delay whereby the actual release time could be 9:00:05 AM, for instance. In high yield production wells, a difference of five seconds could provide a significant error in the volume of water that is calculated to enter the well between any two injection depths. Therefore, the control system 32 works with the down-hole portion of the tracer injection system 30 to make sure that the injection tube 58 is sufficiently loaded with tracer material 36 and substantially absent, if not totally absent, of air. In order to prevent air from entering the injection tube 58, the tracer material 36 is fed to the injection tube 58 through a feeder tank 72. In some embodiments, the feeder tank 72 is placed at an elevation that is higher than the hose reel 74 that stores the injection tube 58. Gravity forces more tracer material 36 into the injection tube 58. There is also a fluid level meter (not shown) for the tracer 36 on the outside of the feeder tank 72 such that the operator can always add more tracer material 36 when the tracer level descends to a trigger point inside the feeder tank 72. This process inhibits air from entering the injection tube 58 from the feeder tank 72 being emptied.

Additionally, as noted above, in some embodiments, to prepare the tracer injection system 30 for insertion into the well 10, a weighting system 76, e.g., a tethered string of one or more weights (preferably formed from stainless steel metal), can be attached at or near the bottom of the tracer injection system 30. The weighted tracer injection system 30 can then be inserted through the annulus 54 (or via the access pipe 256) into the well 10.

In various applications, the weights 76 are a valuable asset for the flowmeter profiling system 12 in that they provide vertical stabilization and inertia for the tracer injection system 30 within the turbulent well—i.e. maintaining a straight path of descent and egress with minimal swinging and winding as a result of fluid turbulence. Another advantage of the weighting system 76 is that since it can be comprised of multiple weights that are longer in the vertical direction and rounded at both ends, it is allowed to articulate within the well 10 so as to radius around obstructions such as pump collars and the primary pump 28 itself when performing the flowmeter profiling survey without an access pipe 256. The weights themselves are typically small in diameter, ranging from one-quarter inch outer diameter to as much as one inch outer diameter and are typically three to four inches in length and rounded on both ends of the weight to eliminate sharp angles that may be spatially disruptive to descent and egress from the well 10. In some embodiments, each weight is bored through the center such that a support cable 478 (e.g., a stainless steel support cable, illustrated more clearly in FIG. 4A) can be threaded through and then terminated at the base of the cable where it exits the last weight located at the end of the weighting system 76.

Figure 2:
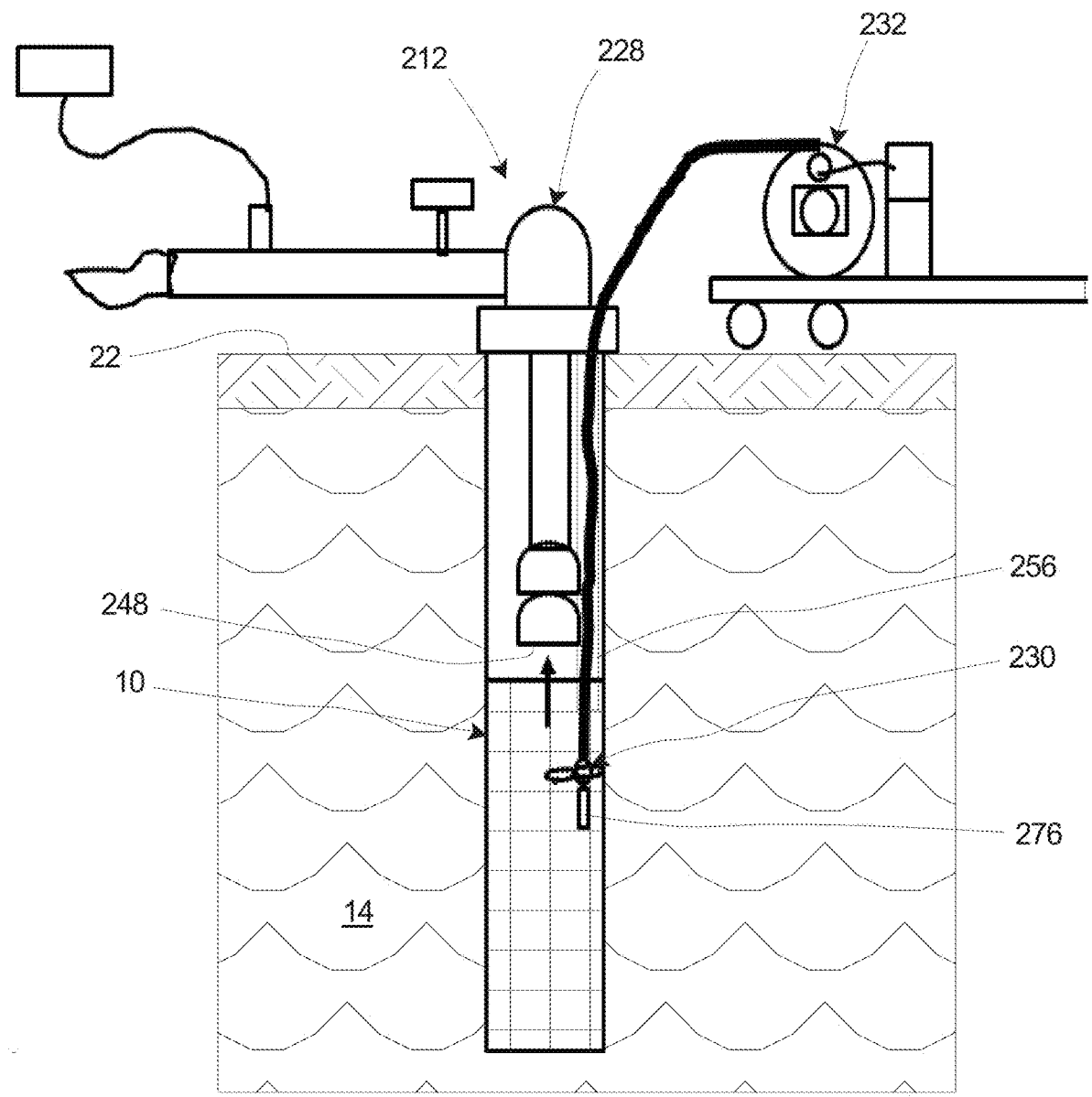
FIG. 2 is a simplified schematic illustration of the groundwater production well and another embodiment of the flowmeter profiling system, the flowmeter profiling system including another embodiment of the single-depth tracer injection system.

FIG. 2 is a simplified schematic illustration of the groundwater production well 10 and another embodiment of the flowmeter profiling system 212. As shown, the flowmeter profiling system 212 is substantially similar to the flowmeter profiling system 12 illustrated and described above. For example, the flowmeter profiling system 212 again includes a primary pump assembly 228, a tracer injection system 230 and a control system 232 that are substantially similar to the corresponding components illustrated and described above. Accordingly, such components will not be described in detail herein.

However, in this embodiment, the groundwater well 10 further includes an access pipe 256 for purposes of enabling the tracer injection system 230 to be installed within the groundwater well 10 and positioned below the primary pump 228, i.e. without the need for removing the primary pump 228 from the well 10. In particular, in cases where the annulus 54 (illustrated in FIG. 1A) is too small and the tracer injection system 230 cannot pass the pump 228 and/or pump collars within the naturally occurring annulus 54, the well owner can remove the primary pump 228 from the well 10 and install an access pipe 256 that extends from the surface 22 to some distance past the pump intake 248 at depth.

It is appreciated that for the purpose of the present invention, it is desired that the primary pump 228 be used and reinstalled with the access pipe 256 back into the well 10. The primary pump 228 provides the actual pumping rate and geometry to create the exact conditions inside the well 10 in order to accurately profile the zonal flow of the groundwater 14 within the well 10. Using a smaller (or larger) pump in place of the primary pump 228 can change the turbulent patterns inside the well 10, and can change the free annular volume inside the well 10, as well as the pumping rate—all of which contribute to potentially changing the distribution of flow of the groundwater 14 within the well 10. Although the access pipe 256 does displace a small percentage of annular volume, it is not significant enough to offset water flow distribution in the same manner as a change in pump diameter, pump column diameter and pumping rate.

As with the previous embodiments, to prepare the tracer injection system 230 for insertion into the well 10, a weighting system 276 can be attached at or near the bottom of the tracer injection system 230. The weighted tracer injection system 230 can then be inserted through the access pipe 256 into the well 10. The weighting system 276 again provides vertical stabilization for the tracer injection system 230 within the turbulent well 10.

Figure 3:
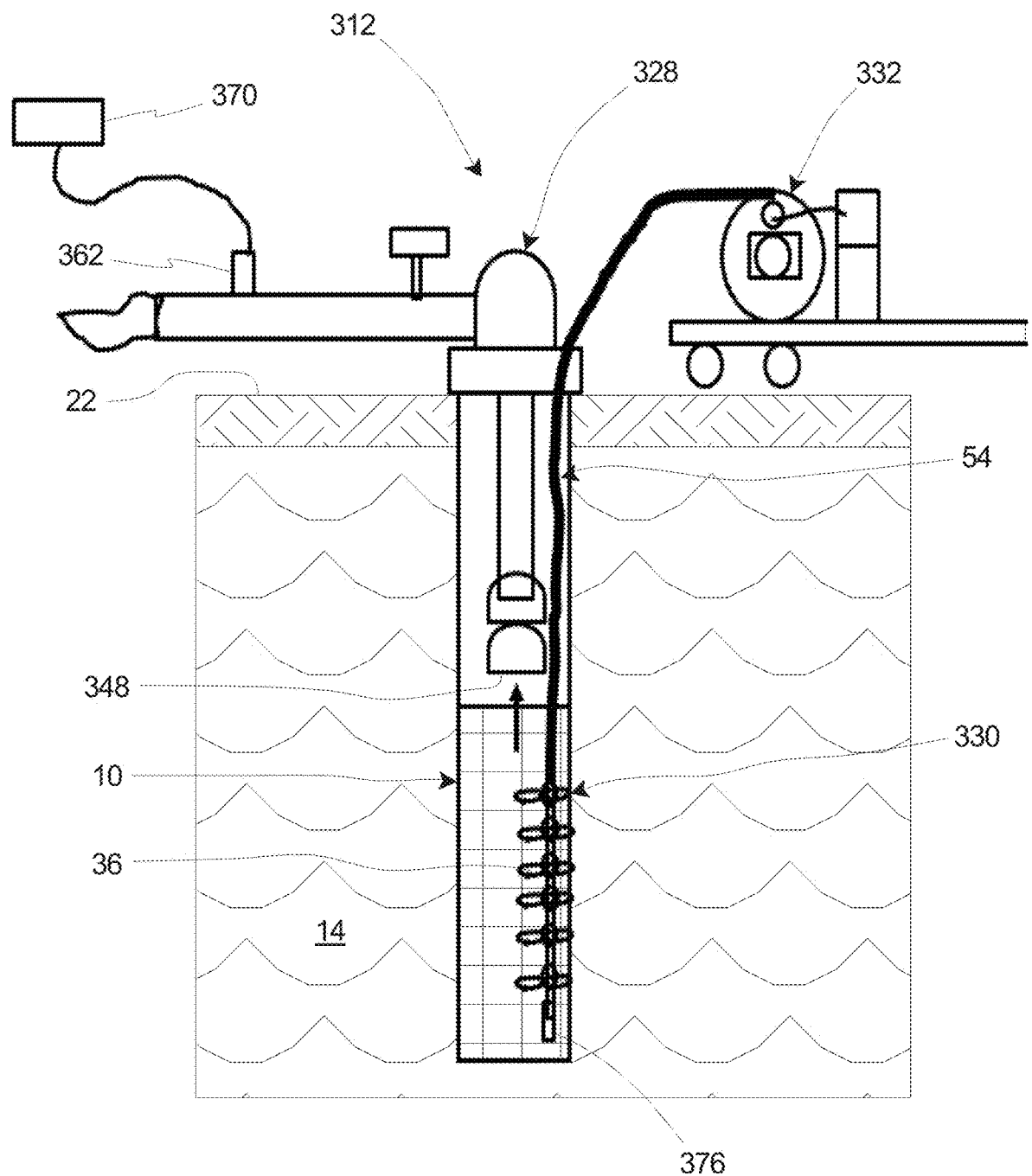
FIG. 3 is a simplified schematic illustration of the groundwater production well and still another embodiment of the flowmeter profiling system, the flowmeter profiling system including a multi-depth tracer injection system.

FIG. 3 is a simplified schematic illustration of the groundwater production well 10 and still another embodiment of the flowmeter profiling system 312. As illustrated in this embodiment, the flowmeter profiling system 312 is somewhat similar to the previously described embodiments. For example, the flowmeter profiling system 312 again includes a primary pump assembly 328 and a control system 332 that perform the same basic functions as in the previous embodiments.

However, in this embodiment, the tracer injection system 330 is somewhat different than what was shown and described in the previous embodiments, In particular, as shown in FIG. 3, the flowmeter profiling system 312 includes a multi-depth tracer injection system 330 that can substantially simultaneously measure the flow of the groundwater 14 at multiple depths within the well 10. Additionally, the multi-depth tracer injection system 330 can measure the fluid flow at multiple depths within the well 10 without having to move the tracer injection system 330 to different positions or depths within the well 10 in order to measure the fluid flow at the desired different depths. With such design, the multi-depth tracer injection system 330 can further provide an increased efficiency to the process of measuring the flow of the groundwater 14 at multiple depths within the well 10.

It is appreciated that in alternative embodiments, the tracer injection system 330 can be small enough to be inserted into the well 10 and past the pump assembly 328 via the annulus 54, or the tracer injection system 330 can be inserted into the well 10 by means of an access pipe 256 (illustrated in FIG. 2) that extends from the surface 22 to some distance past the pump intake 348 at depth.

It is further appreciated that in various embodiments, the tracer injection system 330 can again provide significant improvements in the areas of accuracy, time-efficiency and cost-efficiency for the flowmeter profiling system 312 in comparison to existing systems.

As provided herein, the design of the multi-depth tracer injection system 330 can be varied. Additionally, although the control system 332 has the same general design and functionality as in the previous embodiments, it is understood that the design of the control system 332 may vary somewhat depending on the specific design of the multi-depth tracer injection system 330.

FIGS. 4A and 4B provide simplified schematic illustrations of one embodiment of the multi-depth tracer injection system 430. In particular, FIG. 4A is an enlarged schematic perspective view illustration of a portion of an embodiment of the multi-depth tracer injection system 430. Additionally, FIG. 4B is an enlarged schematic perspective view illustration of another portion of the multi-depth tracer injection system 430 illustrated in FIG. 4A.

In particular, in this embodiment, the tracer injection system 430 includes a plurality of tracer injection tubes 458, each of which terminates with a corresponding injection port 460. As shown in FIG. 4A, each of the injection tubes 458 can terminate with the injection ports 460 positioned at different depths within the well 10 (illustrated in FIG. 3). Thus, each injection tube 458 and corresponding injection port 460 is configured to measure the flow of the groundwater 14 (illustrated in FIG. 3) at a different depth within the well 10.

The design of each injection tube 458 and injection port 460 can be substantially similar to what was illustrated and described above. For example, each injection tube 458 can be coupled to the control system 332 (illustrated in FIG. 3) and can extend downward from the surface 22 (illustrated in FIG. 3) into the well 10 and past the primary pump 328 (illustrated in FIG. 3). The injection tube 458 again provides a conduit and receptacle for the tracer material 36 (illustrated in FIG. 3) that is moved down into the well 10 and ultimately injected into the groundwater 14 within the well 10. Additionally, each injection tube 458 can be supplied with the appropriate volume of tracer material 36 under control of the control system 332 as described above.

Additionally, each injection port 460 can again include an injection valve 64 (illustrated in FIG. 1B), and a cylinder 66 (illustrated in FIG. 1B) having multiple exit holes 68 (illustrated in FIG. 1B) that are circumferentially spaced around the cylinder 66. The multiple exit holes 68 again allow the tracer 36 to exit the cylinder 66, simultaneously at multiple points, and in a substantially horizontal direction into the well 10 at each point to fill substantially the entire cross-sectional area of the well 10 at each desired depth.

The number of injection tubes 458 and the spacing between the injection ports 460, i.e. the difference in depth between the injection ports 460, can be varied to suit the requirements of the tracer injection system 430. For example, as illustrated in FIG. 4A, the tracer injection system 430 can include seven individual injection tubes 458, each with a corresponding injection port 460. Alternatively, the tracer injection system 430 can include greater than seven or fewer than seven injection tubes 458 and injection ports 460. For example, in certain non-exclusive alternative embodiments, the tracer injection system 430 can include four, five, six, eight, nine or ten injection tubes 458 and corresponding injection ports 460. Still alternatively, the tracer injection system 430 can include another desired number of injection tubes 458 and injection ports 460. It is recognized, however, that the number of separate injection tubes 458 and injection ports 460 can be limited by the width of the annular access 54 (illustrated in FIG. 3) that the well 10 can provide or by the internal diameter of the small diameter access pipe 256 (illustrated in FIG. 2) that is used to transit past the primary pump 328 and pump intake 348 (illustrated in FIG. 3).

Additionally, in some embodiments, the depth-related spacing between adjacent injection ports 460 can be approximately five feet, ten feet, fifteen feet, twenty feet, twenty-five feet, thirty feet, thirty-five feet or forty feet. Alternatively, the depth-related spacing between adjacent injection ports 460 can be different than what is specifically listed above. Still alternatively, the depth-related spacing between adjacent injection ports 460 need not be consistent, such that the depth-related spacing between any pair of adjacent injection ports 460 can be different than the depth-related spacing between any other pair of adjacent injection ports 460.

Further, as illustrated, in certain embodiments, all of the injection tubes 458 can be conjoined together within a single jacket 480 so that the entire bundle of injection tubes 458 behaves as a single unit as it enters and is retrieved from the well 10. One notable benefit of the injection tubes 458 being conjoined together within the jacket 480 is that a single counter depth can be used for multiple injection depths. As an example, if there are eight simultaneous injection ports 460 and depths, and each injection port 460 is spaced twenty (20) feet apart, if the shallowest injection port 460 is deployed to a depth of 400 feet below the surface 22, there can be simultaneous injections at 400, 420, 440, 460, 480, 500, 520 and 540 feet, respectively. This strategy eliminates the potential counter error associated with each of the eight depths. In other words, there is one counter reading for eight depths instead of eight separate counter readings (whereby there is one for each depth). If there are eight more injection depths to perform, then as an example, the shallowest injection port 460 can be lowered to the next depth, say 560 feet below the surface 22, with simultaneous injection depths at 560, 580, 600, 620, 640, 660, 680 and 700 feet.

Figure 5:
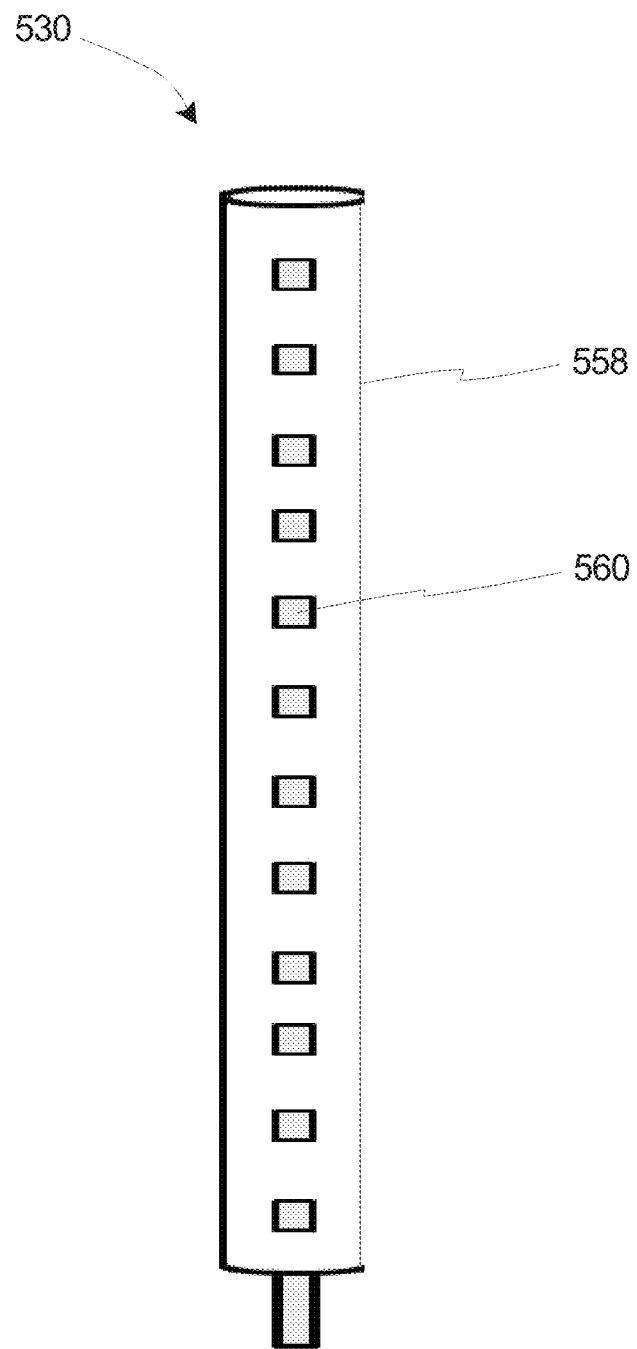
FIG. 5 is an enlarged schematic side view illustration of a portion of another embodiment of the multi-depth tracer injection system.

FIG. 5 is an enlarged schematic side view illustration of a portion of another embodiment of the multi-depth tracer injection system 530. As illustrated in FIG. 5, the multi-depth tracer injection system 530 includes a single injection tube 558 with multiple injection ports 560 along a length of the injection tube 458. Each injection port 460 can be affixed to the outside of the injection tube 458.

In this embodiment, the pathway of the tracer material 36 from the injection tube 558 into each of the injection ports 560 consists of a high pressure, fluid tight seal between the injection port 560 and the injection tube 558. Each injection port 460 includes a valve that circumferentially spreads the tracer material 36 (illustrated in FIG. 3) through the cross-sectional plane of the well 10 (illustrated in FIG. 3) at any desired depth. Although the diameter of the injection tube 558 fractionally interferes with the radial spread of the tracer material 36; as a practical matter most of the radial directions inside the well 10 are covered instantly following injection of the tracer material 36 into the well 10, and quickly infills the blind section of the well 10 caused by the interfering injection tube 558.

One advantage of this configuration can be that a greater number of simultaneous injection points can be provided for the purpose of expediting the flow metering survey. However, as above, it is understood that the number of injection ports 560 and the depth-related spacing between the injection ports 560 can be varied as desired.

Returning back to FIG. 3, regardless of whether the multi-depth tracer injection system 330 includes multiple injection tubes with an injection port for each injection tube, or a single injection tube with multiple injection ports, the tracer injection system again includes the tracer detector 362, e.g., fluorometer, for detecting the return of the tracer material 36 for each desired depth. In particular, the return of the tracer material 36 for each depth can be ascertained by the order in which the fluorescent tracer signals are recorded by the fluorometer 362 and/or computing device 370, as well as the manual recording by the field operator and/or automatic storage into the computing device 370.

Additionally, as with the previous embodiments, to prepare the tracer injection system 330 for insertion into the well 10, a weighting system 376 can be attached at or near the bottom of the tracer injection system 330. The weighted tracer injection system 330 can then be inserted through the annulus 54 or access pipe 256 into the well 10. The weighting system 376 again provides vertical stabilization for the tracer injection system 330 within the turbulent well 10.

As provided herein, the tracer injection system 30, 430, 530 of the present invention can be found in at least three basic configurations. In summary, three of the configurations for the tracer injection system can be: (1) a single-depth tracer injection system 30 including a single injection port 60; (2) a multi-depth tracer injection system 430 including multiple injection tubes 458 and multiple injection ports 460; and/or (3) a multi-depth tracer injection system 530 including a single injection tube 558 with multiple injection ports 560. Additionally, it is appreciated that each of the above three configurations of the tracer injection system 30, 430, 530 described herein above can be combined with downhole water samplers (i.e. as part of a water sampling assembly) and/or sensors. Further, as described in detail below, each of the noted designs of the tracer injection system 30, 430, 530 can be combined with multiple miniaturized down-hole tracer detectors, e.g., fluorometers.

Figure 6:
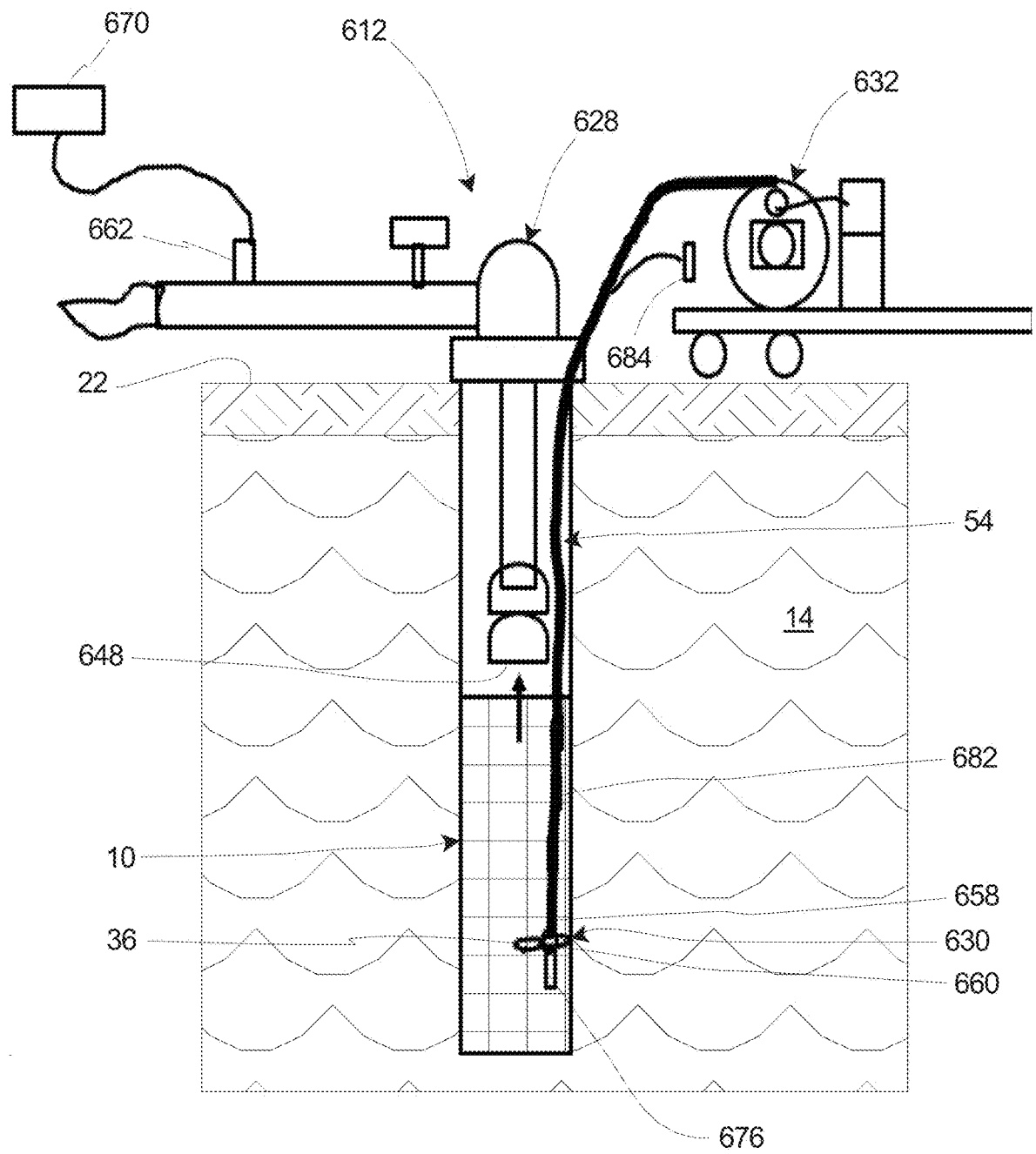
FIG. 6 is a simplified schematic illustration of the groundwater production well and yet embodiment of the flowmeter profiling system, the flowmeter profiling system including an embodiment of the single-depth tracer injection system being utilized in conjunction with multiple miniaturized down-hole fluorometers.

FIG. 6 is a simplified schematic illustration of the groundwater production well 10 and yet embodiment of the flowmeter profiling system 612. As illustrated in this embodiment, the flowmeter profiling system 612 is somewhat similar to the flowmeter profiling system 12 illustrated and described above in relation to FIG. 1A. More particularly, the flowmeter profiling system 612 again includes a primary pump assembly 628 and a control system 632 that are substantially similar to what was described in detail above. Additionally, the tracer injection system 630 is again a single-depth tracer injection system that includes an injection tube 658 and an injection port 660 that are substantially similar in design and function to what was described in detail above.

However, in the embodiment illustrated in FIG. 6, in addition to (or in lieu of) the surface-based tracer detector 662, the tracer injection system 630 further includes at least one, but preferably a plurality of miniaturized down-hole tracer detectors 682, e.g., fluorometers. As illustrated, each of the down-hole tracer detectors 682 can be coupled to the injection tube 658 such that the injection tube 658 and the down-hole tracer detectors 682 can behave as a single unit as they enter and are retrieved from the well 10. The number of down-hole tracer detectors 682 can be varied to suit the specific requirements of the tracer injection system 630 and/or the flowmeter profiling system 612. For example, in certain embodiments, the tracer injection system 630 can include between one and eight down-hole tracer detectors 682. Alternatively, the tracer injection system 630 can include another number of down-hole tracer detectors 682.

It is appreciated that in alternative embodiments, the tracer injection system 630 can be small enough to be inserted into the well 10 and past the pump assembly 628 via the annulus 54, or the tracer injection system 630 can be inserted into the well 10 by means of an access pipe 256 (illustrated in FIG. 2) that extends from the surface 22 to some distance past the pump intake 648 at depth.

It is further appreciated that in various embodiments, the tracer injection system 630 can again provide significant improvements in the areas of accuracy, time-efficiency and cost-efficiency for the flowmeter profiling system 612 in comparison to existing systems.

When the tracer material 36 is injected at any depth, the release time is time stamped by one or more, and preferably all, of the down-hole fluorometers 682. The return of the tracer material 36 to each of the down-hole fluorometers 682 is also time stamped by the down-hole fluorometers 682 and/or by the computing device 670, and can be manually recorded on the field data sheet, or automatically stored in the computing device 670. As above, the return time or "return" of the tracer material is when the tracer material 36 within the water is specifically detected by one of (or each of) the down-hole fluorometers 682.

By knowing the travel time of the tracer material 36 back to each of the down-hole tracer detectors 682 from each release point, knowing the depth of each release point, and knowing the cross-sectional surface area of the well 10 at each release point, the Continuity Equation can be applied to determine the volume and percentage of cumulative flow of the groundwater 14 within the well 10 from each pair of consecutive release points.

Additionally, as shown in FIG. 6, the flowmeter profiling system 612 can further include a data logger 684, e.g., a handheld single and/or multichannel fluorometer data logger, that can be utilized in conjunction with the control system 632. The data logger 684 can be utilized by the operator to further record, control and utilize the data that is generated through use of the down-hole tracer detectors 682.

Further, as with the previous embodiments, to prepare the tracer injection system 630 for insertion into the well 10, a weighting system 676 can be attached at or near the bottom of the tracer injection system 630. The weighted tracer injection system 630 can then be inserted through the annulus 54 or access pipe 256 into the well 10. The weighting system 676 again provides vertical stabilization for the tracer injection system 630 within the turbulent well 10.

Figure 7:
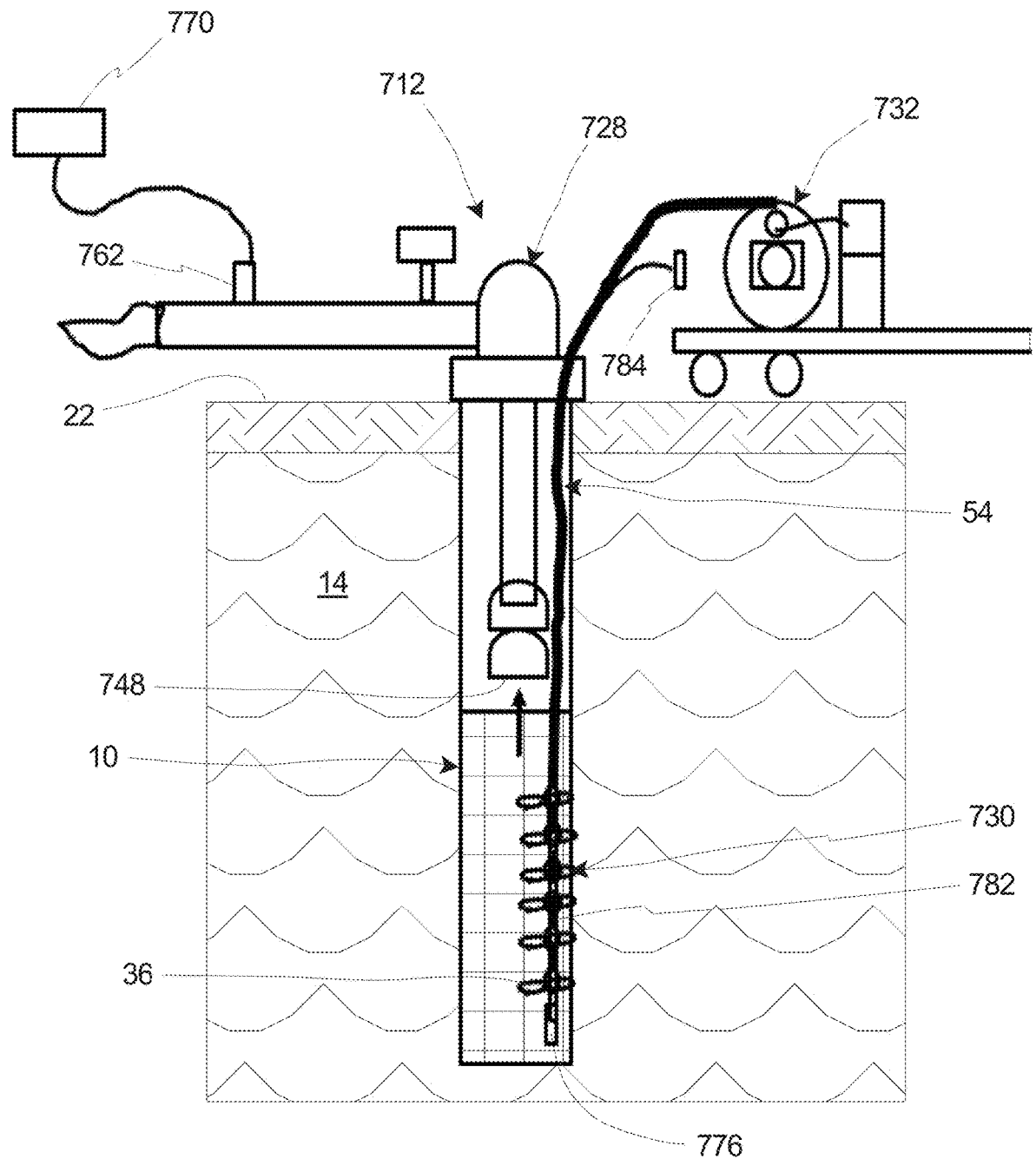
FIG. 7 is a simplified schematic illustration of the groundwater production well and still yet another embodiment of the flowmeter profiling system, the flowmeter profiling system including an embodiment of the multi-depth tracer injection system being utilized in conjunction with multiple miniaturized down-hole fluorometers.

FIG. 7 is a simplified schematic illustration of the groundwater production well 10 and still yet another embodiment of the flowmeter profiling system 712. As illustrated in this embodiment, the flowmeter profiling system 712 is somewhat similar to the flowmeter profiling system 312 illustrated and described above in relation to FIG. 3. More particularly, the flowmeter profiling system 712 again includes a primary pump assembly 728 and a control system 732 that are substantially similar to what was described in detail above. Additionally, the tracer injection system 730 is again a multi-depth tracer injection system that that can substantially simultaneously measure the flow of the groundwater 14 at multiple depths within the well 10.

However, in the embodiment illustrated in FIG. 7, in addition to (or in lieu of) the surface-based tracer detector 762, the tracer injection system 730 further includes at least one, but preferably a plurality of miniaturized down-hole tracer detectors 782, e.g., fluorometers. As with the embodiment illustrated in relation to FIG. 6, when the tracer material 36 is injected at any depth, the release time is time stamped by one or more, and preferably all, of the down-hole fluorometers 782. The return of the tracer material 36 to each of the down-hole fluorometers 782 is also time stamped by the down-hole fluorometers 782 and/or by the computing device 770, and can be manually recorded on the field data sheet, or automatically stored in the computing device 770. By knowing the travel time of the tracer material 36 back to the down-hole tracer detectors 782 from each release point, knowing the depth of each release point, and knowing the cross-sectional surface area of the well 10 at each release point, the Continuity Equation can be applied to determine the volume and percentage of cumulative flow of the groundwater 14 within the well 10 from each pair of consecutive release points.

Additionally, as shown in FIG. 7 and similar to the embodiment illustrated in FIG. 6, the flowmeter profiling system 712 can further include a data logger 784, e.g., a handheld single and/or multichannel fluorometer data logger, that can be utilized in conjunction with the control system 732. The data logger 784 can again be utilized by the operator to further record, control and utilize the data that is generated through use of the down-hole tracer detectors 782.

It is appreciated that in alternative embodiments, the tracer injection system 730 can be small enough to be inserted into the well 10 and past the pump assembly 728 via the annulus 54, or the tracer injection system 730 can be inserted into the well 10 by means of an access pipe 256 (illustrated in FIG. 2) that extends from the surface 22 to some distance past the pump intake 748 at depth.

It is further appreciated that in various embodiments, the tracer injection system 730 can again provide significant improvements in the areas of accuracy, time-efficiency and cost-efficiency for the flowmeter profiling system 712 in comparison to existing systems.

Figure 8A:
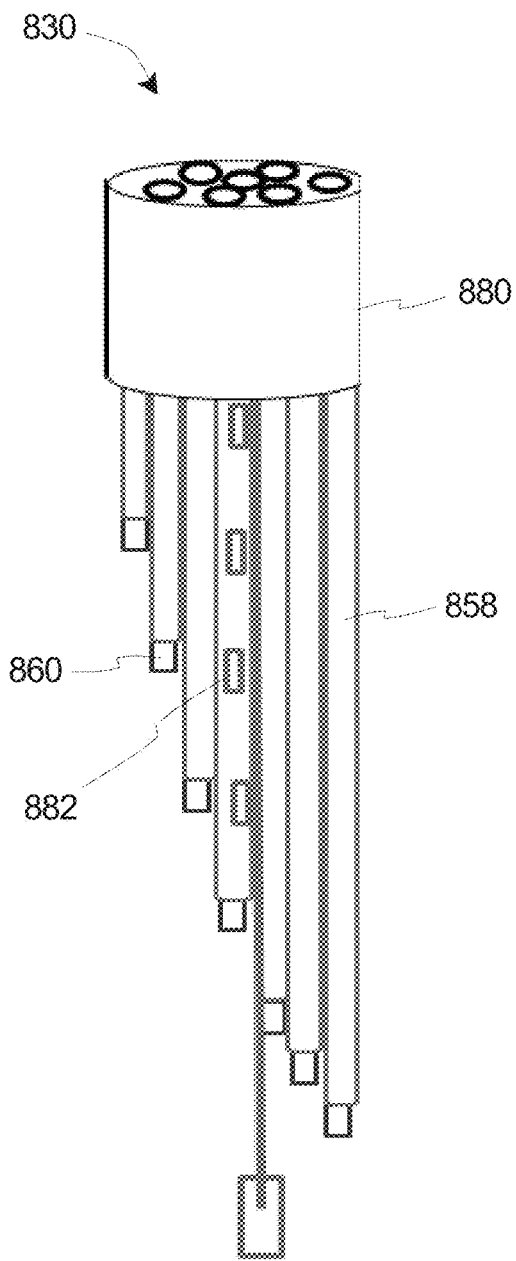
FIG. 8A is an enlarged schematic perspective view illustration of a portion of an embodiment of the multi-depth tracer injection system being utilized in conjunction with multiple miniaturized down-hole fluorometers.
Figure 8B:
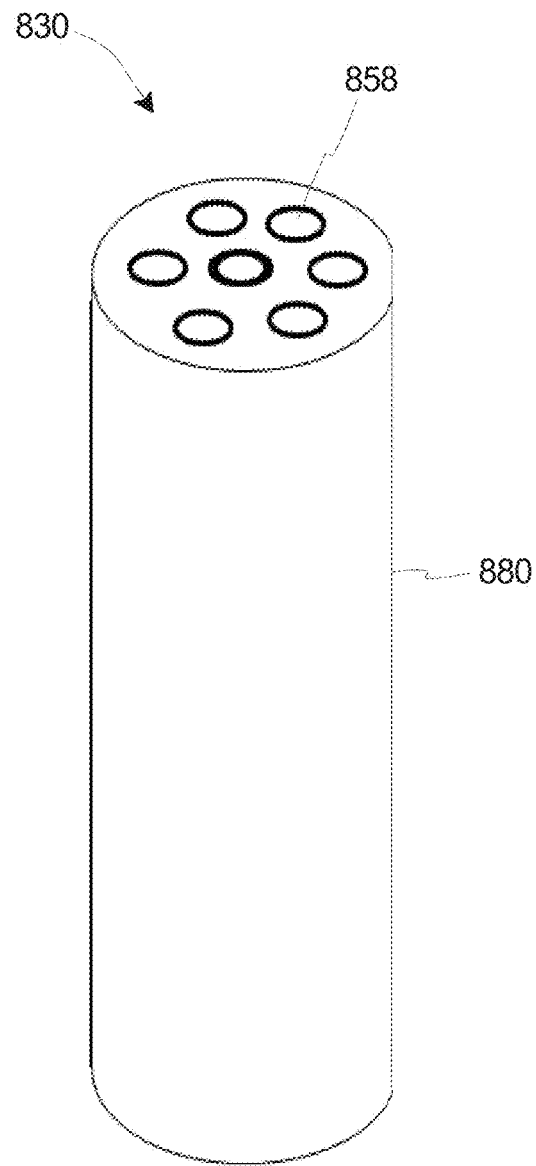
FIG. 8B is an enlarged schematic perspective view illustration of another portion of the multi-depth tracer injection illustrated in FIG. 8A being utilized in conjunction with multiple miniaturized down-hole fluorometers.

As provided herein, the design of the multi-depth tracer injection system 730 can be varied. For example, FIGS. 8A and 8B provide simplified schematic illustrations of one embodiment of the multi-depth tracer injection system 830. In particular, FIG. 8A is an enlarged schematic perspective view illustration of a portion of an embodiment of the multi-depth tracer injection system 830. Additionally, FIG. 8B is an enlarged schematic perspective view illustration of another portion of the multi-depth tracer injection system 830 illustrated in FIG. 8A.

The embodiment of the multi-depth tracer injection system 830 illustrated in FIGS. 8A and 8B is somewhat similar to the multi-depth tracer injection 430 illustrated and described in relation to FIGS. 4A and 4B. In particular, in this embodiment, the tracer injection system 830 again includes a plurality of tracer injection tubes 858, each of which terminates with a corresponding injection port 860. Additionally, each of the injection tubes 858 can terminate with the injection ports 860 positioned at different depths within the well 10 (illustrated in FIG. 7). Thus, each injection tube 858 and corresponding injection port 860 is again configured to measure the flow of the groundwater 14 (illustrated in FIG. 7) at a different depth within the well 10.

The design of each injection tube 858 and injection port 860 can be substantially similar to what was illustrated and described above.

Further, the number of injection tubes 858 and the spacing between the injection ports 860, i.e. the difference in depth between the injection ports 860, can again be varied to suit the requirements of the tracer injection system 830.

Additionally, as illustrated, in certain embodiments, all of the injection tubes 858 can be conjoined together within a single jacket 880 so that the entire bundle of injection tubes 858 behaves as a single unit as it enters and is retrieved from the well 10.

However, in the embodiment illustrated in FIG. 8A, the tracer injection system 830 further includes the plurality of miniaturized down-hole tracer detectors 882, e.g., fluorometers. As illustrated, each of the down-hole tracer detectors 882 can be coupled to one of the injection tubes 858. As such, the down-hole tracer detectors 882 are also conjoined together with all of the injection tubes 858 within the jacket 880. In some embodiments, each of the down-hole tracer detectors 882 is coupled to the same injection tube 858. Alternatively, one or more of the down-hole tracer detectors 882 can be coupled to different injection tubes 858.

Figure 9:
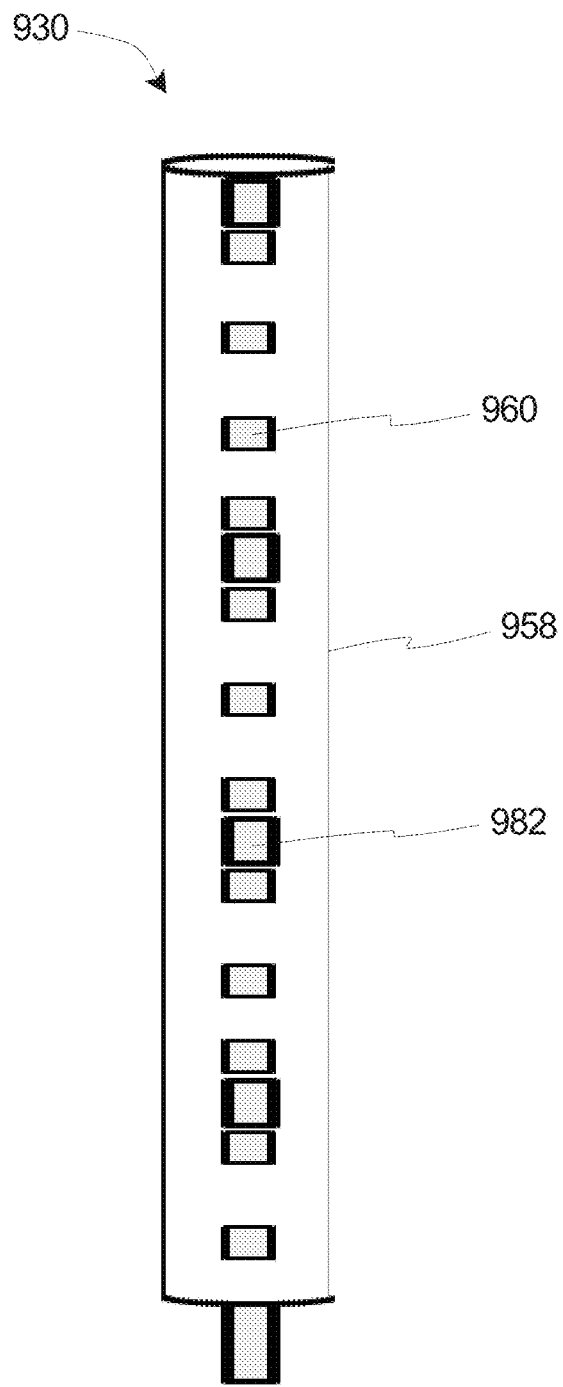
FIG. 9 is an enlarged schematic side view illustration of a portion of another embodiment of the multi-depth tracer injection system being utilized in conjunction with multiple miniaturized down-hole fluorometers.

Additionally, FIG. 9 is an enlarged schematic side view illustration of a portion of another embodiment of the multi-depth tracer injection system 930. The embodiment of the multi-depth tracer injection system 930 illustrated in FIG. 9 is somewhat similar to the multi-depth tracer injection 530 illustrated and described in relation to FIG. 5. In particular, in this embodiment, the tracer injection system 930 again includes a single injection tube 958 with multiple injection ports 960 along a length of the injection tube 958. Each injection port 960 can be affixed to the outside of the injection tube 958. Further, as shown, each injection port 960 can be at a different depth within the well 10 (illustrated in FIG. 7). Thus, each injection port 960 is again configured to measure the flow of the groundwater 14 (illustrated in FIG. 7) at a different depth within the well 10.

However, in the embodiment illustrated in FIG. 9, the tracer injection system 930 further includes the plurality of miniaturized down-hole tracer detectors 982, e.g., fluorometers. As illustrated, each of the down-hole tracer detectors 982 can be coupled to the injection tube 958 such that the injection tube 958 and the down-hole tracer detectors 982 can behave as a single unit as they enter and are retrieved from the well 10.

Returning back to FIG. 7, as with the previous embodiments, to prepare the tracer injection system 730 for insertion into the well 10, a weighting system 776 can be attached at or near the bottom of the tracer injection system 730. The weighted tracer injection system 730 can then be inserted through the annulus 54 or access pipe 256 into the well 10. The weighting system 776 again provides vertical stabilization for the tracer injection system 730 within the turbulent well 10.

Moreover, combining water samplers 34 (illustrated in FIG. 1A, such as miniaturized pumps, bailers and grab samplers) there are a number of configurations that can be employed: (1) Single Tube Injection Port combined with depth co-located miniaturized pump; (2) Multiple Tube Injection Ports combined with depth co-located pumps for each injection port or for any number of the injection ports; (3) Single Tube with Multiple Depth Injection Ports combined with depth located pumps at each injection port or for any number of the injection ports; and (4) Single Tube Injection Port combined with any number of in-line, fixed or variably spaced, down-hole fluorometers with up-hole reader.

It is understood that although a number of different embodiments of the flowmeter profiling system 12 have been illustrated and described herein, one or more features of any one embodiment can be combined with one or more features of one or more of the other embodiments, provided that such combination satisfies the intent of the present invention.

While a number of exemplary aspects and embodiments of the flowmeter profiling system 12 have been shown and disclosed herein above, those of skill in the art will recognize certain modifications, permutations, additions and sub-combinations thereof. It is therefore intended that the flowmeter profiling system shall be interpreted to include all such modifications, permutations, additions and sub-combinations as are within their true spirit and scope, and no limitations are intended to the details of construction or design herein shown.

What is claimed is:

1. A flowmeter profiling system for measuring a flow profile of water in a subsurface environment, the flowmeter profiling system comprising:
a tracer injection system positioned at least partially within the subsurface environment, the tracer injection system including an injection tube that contains a tracer material, and an injection port that is coupled to the injection tube, the injection port being configured to inject the tracer material substantially horizontally into the subsurface environment; wherein the tracer injection system is a multi-depth tracer injection system that further includes a second injection port that is coupled to the injection tube, the second injection port being spaced apart from the injection port along a length of the injection tube; wherein the injection port is configured to inject the tracer material substantially horizontally into the subsurface environment at a first depth; and wherein the second injection port is configured to inject the tracer material substantially horizontally into the subsurface environment at a second depth that is different than the first depth.

2. The flowmeter profiling system of claim 1 wherein the tracer injection system further includes a tracer detector that is positioned at a surface above the subsurface environment; and wherein the tracer detector detects the presence of the tracer material within the water to measure the flow profile of the water within the subsurface environment at each of the first depth and the second depth.

3. The flowmeter profiling system of claim 1 wherein the tracer injection system further includes a tracer detector that is coupled to the injection tube within the subsurface environment; and wherein the tracer detector detects the presence of the tracer material within the water to measure the flow profile of the water within the subsurface environment at each of the first depth and the second depth.

4. The flowmeter profiling system of claim 1 further comprising a primary pump that is positioned within the subsurface environment; wherein the tracer injection system includes the injection tube being positioned within the subsurface environment such that the injection port is positioned below the primary pump; and wherein the primary pump is turned on to pump the water within the subsurface environment such that the flowmeter profiling system measures a dynamic flow profile of the water in the subsurface environment.

5. The flowmeter profiling system of claim 1 wherein the tracer material has a specific gravity that is within ten percent of a specific gravity of the water within the subsurface environment.

6. The flowmeter profiling system of claim 1 wherein the tracer material becomes diluted and asymptotically approaches a specific gravity of the water within the subsurface environment so the tracer material moves at a same rate as the water within the subsurface environment.

7. A water sampling assembly for use within a subsurface environment, the water sampling assembly including a water sampler that samples water within the subsurface environment, and the flowmeter profiling system of claim 1 that measures a flow profile of the water in the subsurface environment.

8. The flowmeter profiling system of claim 1 wherein the second injection port is configured to inject the tracer material substantially horizontally into the subsurface environment so that the tracer material directly contacts and radially spreads through the water within the subsurface environment.

9. The flowmeter profiling system of claim 1 wherein the second injection port includes a plurality of exit holes, and wherein the tracer material is injected substantially horizontally into the subsurface environment through each of the plurality of exit holes of the second injection port.

10. The flowmeter profiling system of claim 1 wherein the injection port is configured to inject the tracer material substantially horizontally into the subsurface environment so that the tracer material directly contacts and radially spreads through the water within the subsurface environment.

11. The flowmeter profiling system of claim 1 wherein the injection port includes a plurality of exit holes, and wherein the tracer material is injected substantially horizontally into the subsurface environment through each of the plurality of exit holes.

12. The flowmeter profiling system of claim 11 wherein the water is in a groundwater production well including a support casing and a well screen that are positioned within the subsurface environment, the groundwater production well having a cross-sectional plane, and wherein the tracer material is injected substantially perpendicularly relative to a longitudinal axis of one of the support casing and the well screen into the groundwater production well through each of the plurality of exit holes to fill substantially the entire cross-sectional plane of the groundwater production well.

13. The flowmeter profiling system of claim 12 wherein the flowmeter profiling system further comprises a primary pump that is positioned within the groundwater production well, the primary pump defining at least a portion of an annulus between the primary pump and one of the support casing and the well screen; and wherein the injection tube is positioned within the groundwater production well and below the primary pump via the annulus, and without removing the primary pump from the groundwater production well.

14. The flowmeter profiling system of claim 12 wherein the flowmeter profiling system further comprises a primary pump that is positioned within the groundwater production well; and wherein the injection tube is positioned within the groundwater production well and below the primary pump via an access pipe that is positioned between the primary pump and one of the support casing and the well screen.

15. A flowmeter profiling system for measuring a flow profile of water in a subsurface environment, the flowmeter profiling system comprising:
a tracer injection system positioned at least partially within the subsurface environment, the tracer injection system including an injection tube that contains a tracer material, and an injection port that is coupled to the injection tube, the injection port being configured to inject the tracer material substantially horizontally into the subsurface environment; wherein the tracer injection system is a multi-depth tracer injection system that further includes a second injection tube that contains the tracer material, and a second injection port that is coupled to the second injection tube, the second injection port being configured to inject the tracer material substantially horizontally into the subsurface environment; wherein the injection port is configured to inject the tracer material substantially horizontally into the subsurface environment at a first depth; and wherein the second injection port is configured to inject the tracer material substantially horizontally into the subsurface environment at a second depth that is different than the first depth.

16. The flowmeter profiling system of claim 15 wherein the injection tube and the second injection tube are conjoined together within a single jacket.

17. The flowmeter profiling system of claim 15 wherein the tracer injection system further includes a tracer detector that is positioned at a surface above the subsurface environment; and wherein the tracer detector detects the presence of the tracer material within the water to measure the flow profile of the water within the subsurface environment at each of the first depth and the second depth.

18. The flowmeter profiling system of claim 15 wherein the tracer injection system further includes a tracer detector that is coupled to one of the injection tube and the second injection tube within the subsurface environment; and wherein the tracer detector detects the presence of the tracer material within the water to measure the flow profile of the water within the subsurface environment at each of the first depth and the second depth.

19. The flowmeter profiling system of claim 15 wherein the injection port is configured to inject the tracer material substantially horizontally into the subsurface environment so that the tracer material directly contacts and radially spreads through the water within the subsurface environment.

20. The flowmeter profiling system of claim 15 wherein the second injection port is configured to inject the tracer material substantially horizontally into the subsurface environment so that the tracer material directly contacts and radially spreads through the water within the subsurface environment.

21. The flowmeter profiling system of claim 15 further comprising a primary pump that is positioned within the subsurface environment; wherein the tracer injection system includes the injection tube and the second injection tube being positioned within the subsurface environment such that the injection port and the second injection port are positioned below the primary pump; and wherein the primary pump is turned on to pump the water within the subsurface environment such that the flowmeter profiling system measures a dynamic flow profile of the water in the subsurface environment.

22. The flowmeter profiling system of claim 15 wherein the tracer material has a specific gravity that is within ten percent of a specific gravity of the water within the subsurface environment.

23. The flowmeter profiling system of claim 15 wherein the tracer material becomes diluted and asymptotically approaches a specific gravity of the water within the subsurface environment so the tracer material moves at a same rate as the water within the subsurface environment.

24. A water sampling assembly for use within a subsurface environment, the water sampling assembly including a water sampler that samples water within the subsurface environment, and the flowmeter profiling system of claim 15 that measures a flow profile of the water in the subsurface environment.

25. The flowmeter profiling system of claim 15 wherein the injection port includes a plurality of exit holes, and wherein the tracer material is injected substantially horizontally into the subsurface environment through each of the plurality of exit holes.

26. The flowmeter profiling system of claim 25 wherein the water is in a groundwater production well including a support casing and a well screen that are positioned within the subsurface environment, the groundwater production well having a cross-sectional plane, and wherein the tracer material is injected substantially perpendicularly relative to a longitudinal axis of one of the support casing and the well screen into the groundwater production well through each of the plurality of exit holes to fill substantially the entire cross-sectional plane of the groundwater production well.

27. The flowmeter profiling system of claim 26 wherein the flowmeter profiling system further comprises a primary pump that is positioned within the groundwater production well, the primary pump defining at least a portion of an annulus between the primary pump and one of the support casing and the well screen; and wherein the injection tube and the second injection tube are positioned within the groundwater production well and below the primary pump via the annulus, and without removing the primary pump from the groundwater production well.

28. The flowmeter profiling system of claim 26 wherein the flowmeter profiling system further comprises a primary pump that is positioned within the groundwater production well; and wherein the injection tube and the second injection tube are positioned within the groundwater production well and below the primary pump via an access pipe that is positioned between the primary pump and one of the support casing and the well screen.

* * * * *